United States Patent
Kumon et al.

(10) Patent No.: US 11,691,133 B2
(45) Date of Patent: Jul. 4, 2023

(54) CATALYST FOR EXHAUST GAS OXIDATION, METHOD FOR PRODUCING SAME, AND EXHAUST GAS OXIDATION METHOD USING SAME

(71) Applicant: UMICORE SHOKUBAI JAPAN CO., LTD., Tokoname (JP)

(72) Inventors: Tatsuya Kumon, Kobe (JP); Yosuke Goto, Kobe (JP); Franz Dornhaus, Kobe (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 200 days.

(21) Appl. No.: 17/312,049

(22) PCT Filed: Nov. 11, 2019

(86) PCT No.: PCT/JP2019/044193
§ 371 (c)(1),
(2) Date: Jun. 9, 2021

(87) PCT Pub. No.: WO2020/137201
PCT Pub. Date: Jul. 2, 2020

(65) Prior Publication Data
US 2022/0023847 A1    Jan. 27, 2022

(30) Foreign Application Priority Data

Dec. 28, 2018  (JP) ................. 2018-247139

(51) Int. Cl.
*F01N 3/28* (2006.01)
*B01J 37/03* (2006.01)
(Continued)

(52) U.S. Cl.
CPC ........ *B01J 29/7415* (2013.01); *B01D 53/944* (2013.01); *B01D 53/9468* (2013.01);
(Continued)

(58) Field of Classification Search
CPC .... B01J 29/7415; B01J 21/14; B01J 35/0006; B01J 37/038; B01J 35/1033;
(Continued)

(56) References Cited

U.S. PATENT DOCUMENTS

2009/0044521 A1    2/2009  Cho et al.
2014/0322113 A1 * 10/2014  Blakeman .......... B01D 53/9472
                                                            60/297

(Continued)

FOREIGN PATENT DOCUMENTS

GB    2 468 210 A  *  9/2010  ............. B01D 46/24
JP    2005021818 A     1/2005

(Continued)

OTHER PUBLICATIONS

International Search Report (PCT/ISA/210) with an English translation, and Written Opinion (PCT/ISA/237) dated Jan. 21, 2020, by the Japanese Patent Office as the International Searching Authority for International Application No. PCT/JP2019/044193. (15 pages).

(Continued)

*Primary Examiner* — Timothy C Vanoy
(74) *Attorney, Agent, or Firm* — Buchanan, Ingersoll & Rooney PC

(57) ABSTRACT

Described are a catalyst capable of effectively oxidizing an exhaust gas, a method for preparing the catalyst, and a method for oxidizing an exhaust gas using the catalyst. The exhaust gas oxidation catalyst includes at least two layers, a lower catalyst layer and an upper catalyst layer, laminated on a three-dimensional structure, wherein the lower catalyst layer and the upper catalyst layer independently contain precious metal and alumina and/or zeolite, and at least a part of the upper catalyst layer contains pores derived from a pore connecting agent with a combustion decomposition temperature of 300° C. or more to less than 450° C.

9 Claims, 3 Drawing Sheets

(51) Int. Cl.
   *B01J 35/00* (2006.01)
   *B01J 29/74* (2006.01)
   *B01J 21/14* (2006.01)
   *B01D 53/94* (2006.01)

(52) U.S. Cl.
   CPC ............ *B01J 21/14* (2013.01); *B01J 35/0006* (2013.01); *B01J 37/038* (2013.01); *F01N 3/2803* (2013.01); *B01D 2255/1021* (2013.01); *B01D 2255/1023* (2013.01); *B01D 2255/9022* (2013.01); *B01D 2255/9202* (2013.01); *F01N 2370/04* (2013.01)

(58) Field of Classification Search
   CPC ............... B01J 35/1052; B01D 53/944; B01D 53/9468; B01D 2255/1021; B01D 2255/1023; B01D 2255/9022; B01D 2255/9202; B01D 53/945; F01N 3/2803; F01N 2370/04; F01N 3/103
   See application file for complete search history.

(56) References Cited

U.S. PATENT DOCUMENTS

| | | |
|---|---|---|
| 2017/0292427 A1 | 10/2017 | Yamauchi et al. |
| 2019/0299139 A1 | 10/2019 | Tanaka |

FOREIGN PATENT DOCUMENTS

| | | | | |
|---|---|---|---|---|
| JP | 2006110485 A | 4/2006 | | |
| JP | 2006314894 A | 11/2006 | | |
| JP | 2007072693 A | 3/2007 | | |
| JP | 2009 045 584 A | * | 3/2009 | ............ F01N 3/035 |
| JP | 2015199066 A | 11/2015 | | |
| JP | 2017185465 A | 10/2017 | | |
| JP | 2017217646 A | 12/2017 | | |

OTHER PUBLICATIONS

Notice of Reasons for Refusal dated Mar. 31, 2022, by the Japanese Patent Office in corresponding Japanese Patent Application No. 2020-562896, and an English translation of the Notice. (14 pages).

Extended European Search Report dated Jan. 19, 2022, by the European Patent Office in corresponding European Application No. 19904177.3-1101, (5 pages).

Office Action dated Feb. 27, 2023, by the National Intellectual Property Administration of China in corresponding Chinese Patent Application No. 201980085691.0, with an English translation of the Office Action. (15 pages).

* cited by examiner

CATALYST FOR EXHAUST GAS OXIDATION, METHOD FOR PRODUCING SAME, AND EXHAUST GAS OXIDATION METHOD USING SAME

TECHNICAL FIELD

The present invention relates to a catalyst for oxidizing exhaust gas emitted from an internal combustion engine, a method for producing the catalyst, and a method for oxidizing exhaust gas emitted from an internal combustion engine using the catalyst.

BACKGROUND OF THE INVENTION

Numerous conventional technologies have been proposed for purifying exhaust gas emitted from internal combustion engines. For the purification of exhaust gas from diesel engines, in particular, various technologies have been proposed with the objective of reducing particulate matter (PM) and $NO_x$ contained in the exhaust gas. For example, as a catalyst for purifying exhaust gas, an oxidation catalyst that oxidizes carbon monoxide (hereinafter referred to as "CO") and hydrocarbons (hereinafter referred to as "HC") to carbon dioxide ($CO_2$) and water ($H_2O$), a $NO_x$ storage and reduction catalyst that absorbs nitrogen oxides (hereinafter referred to as "$NO_x$") in an oxidizing atmosphere and reduces and purifies the absorbed $NO_x$ in a reducing atmosphere, etc. have been proposed.

In recent years, the production of a porous catalyst using a pore forming agent having the same average pore size as PM (Japanese Unexamined Patent Application Publication No. 2009-72693) and the use of a pore forming material to hold catalyst particles on the surface of a porous substrate (Japanese Unexamined Patent Application Publication No. 2015-199066) have been disclosed as measures for reducing PM.

SUMMARY OF THE INVENTION

Technical Problem

However, although the conventional catalysts described in Japanese Unexamined Patent Application Publication No. 2009-72693 and Japanese Unexamined Patent Application Publication No. 2015-199066 are effective for removing PM, sufficient oxidation performance cannot be exhibited for the exhaust gas, (in particular CO, HC, and NO) and the like. In detail, the conventional catalysts described in Japanese Unexamined Patent Application 2009-72693 and Japanese Unexamined Patent Application 2015-199066 have relatively large (e.g., 1 μm or more) pores and are effective for PM with large particle sizes. However, gases such as NO, with a molecular size significantly smaller than that of the pore forming agent (pore forming material), are considered to pass through and be discharged quickly without diffusing into the catalyst layer itself due to the large pores formed. For this reason, contact with precious metals and the like is not sufficient, and the exhaust gas oxidation performance cannot be demonstrated efficiently, which may be considered as a disadvantage.

In light of the circumstances described above, an object of the present invention is to provide a catalyst capable of effectively oxidizing exhaust gas, a method of preparing the same, and a method of oxidizing exhaust gas using the same.

Solution to Problem

The present inventors conducted diligent research to solve the problem described above. As a result, it has been found that the problem described above can be resolved with a catalyst layer having a laminated form including at least two layers, a layer close to a three-dimensional structure (lower catalyst layer) and a layer separated from the three-dimensional structure (upper catalyst layer), wherein the upper catalyst layer is formed using a specific pore connecting agent.

In other words, first aspect of the present invention is related to an exhaust gas oxidation catalyst having at least two layers, a lower catalyst layer and an upper catalyst layer, laminated on a three-dimensional structure, wherein the lower catalyst layer and the upper catalyst layer independently comprise precious metal(s) and alumina and/or zeolite, and at least a part of the upper catalyst layer has pores derived from a pore connecting agent with a combustion decomposition temperature of 300° C. or more and less than 450° C.

Second aspect of the present invention is related to a method of preparing an exhaust gas oxidation catalyst, which includes:

preparing a slurry for forming a lower catalyst layer by mixing a precious metal precursor(s) and alumina and/or zeolite, applying the slurry for forming a lower catalyst layer onto a three-dimensional structure, forming a lower catalyst layer containing precious metal(s) and alumina and/or zeolite onto the three-dimensional structure, preparing a slurry for forming an upper catalyst layer by mixing a pore connecting agent with a combustion decomposition temperature of 300° C. or more and less than 450° C., a precious metal precursor (s), and alumina and/or zeolite, applying the slurry for forming an upper catalyst layer on the lower catalyst layer, then holding the workpiece in an oxygen containing gas at a temperature of higher than −170° C. and −20° C. or less relative to the combustion decomposition temperature, forming an upper catalyst layer containing precious metal(s) and alumina and/or zeolite on the lower catalyst layer.

Third aspect of the present invention is related to a method of oxidizing exhaust gases, which includes treating an exhaust gases with the catalyst described above or a catalyst prepared by the method described above.

BRIEF DESCRIPTION OF DRAWINGS

In FIGS. 1A-1C, 1 is a pore having a small pore size; 2 is a pore having an intermediate pore size; 3 is a pore having a large pore size; 10, 10', and 10" are a catalyst; 12 is exhaust gas; 13 is a pore having a large pore size; 13' is a pore having a small pore size; 14, 14', and 14" are upper catalyst layers; 15, 15', and 15" are lower catalyst layers, 16, 16', and 16" are pores within the lower catalyst layer; and 17, 17', 17" are three-dimensional structures.

EMBODIMENTS OF THE INVENTION

Figure 1A:
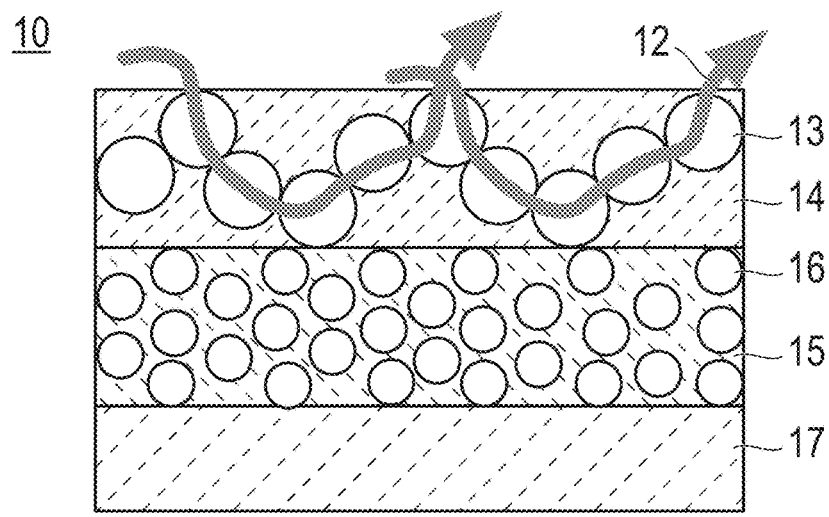
FIGS. 1A-1C are figures explaining an exhaust gas oxidation mechanism according to a catalyst of the present invention.

The first aspect of the present invention relates to an exhaust gas oxidation catalyst having at least two layers, a lower catalyst layer and an upper catalyst layer, laminated on a three-dimensional structure, wherein the lower catalyst layer and the upper catalyst layer independently comprise precious metal(s) and alumina and/or zeolite, and at least a part of the upper catalyst layer has pores derived from a pore connecting agent with a combustion decomposition temperature of 300° C. or more and less than 450° C. By using the catalyst of the present invention, exhaust gas can be effectively oxidized. Therefore, a first aspect of the present invention is the use of an exhaust gas oxidation catalyst for oxidization of an exhaust gas, wherein the exhaust gas oxidation catalyst has at least two layers, a lower catalyst layer and an upper catalyst layer, laminated on a three-dimensional structure, wherein the lower catalyst layer and the upper catalyst layer independently contain precious metal(s) and alumina and/or zeolite, and at least a part of the upper catalyst layer has pores derived from a pore connecting agent with a combustion decomposition temperature of 300° C. or more and less than 450° C.

The second Aspect of the present invention is related to a method of preparing the exhaust gas oxidation catalyst according to the first aspect described above, comprising:

preparing a slurry for forming a lower catalyst layer by mixing a precious metal precursor(s) and alumina and/or zeolite, applying the slurry for forming a lower catalyst layer onto a three-dimensional structure, forming the lower catalyst layer containing precious metal(s) and alumina and/or zeolite onto the three-dimensional structure, preparing a slurry for forming an upper catalyst layer by mixing a pore connecting agent with a combustion decomposition temperature of 300° C. or more and less than 450° C., a precious metal precursor(s), and alumina and/or zeolite, applying the slurry for forming an upper catalyst layer on the lower catalyst layer, then holding the workpiece in an oxygen containing gas at a temperature of higher than −170° C. and −20° C. or less relative to the combustion decomposition temperature, and forming the upper catalyst layer containing precious metal (s) and alumina and/or zeolite on the lower catalyst layer.

The third aspect of the present invention is related to a method of oxidizing exhaust gases, which includes treating an exhaust gas with the catalyst according to the first aspect or a catalyst prepared by the method according to the second aspect.

The catalyst according to the present invention is an exhaust gas oxidation catalyst comprising:

at least two layers, a lower catalyst layer and an upper catalyst layer, wherein said lower catalyst layer and said upper catalyst layer independently comprise precious metal(s) and at least one of alumina and/or zeolite, and at least a part of said upper catalyst layer contains pores derived from a particular pore connecting agent. Namely, at least a part of the upper catalyst layer has pores formed by holding a coating of a slurry for forming an upper catalyst layer comprising a pore connecting agent with a combustion decomposition temperature of 300° C. or more to less than 450° C., a precious metal precursor(s), and alumina and/or zeolite, in an oxygen containing gas at a temperature of higher than −170° C. to −20° C. or less relative to the combustion decomposition temperature. By using a catalyst with this kind of upper catalyst layer, an exhaust gas (for example, CO, HC, NO), especially NO in an exhaust gas, can be effectively oxidized. Although the mechanism for achieving the above effect is unclear, the mechanism is speculated to be as follows. Note that the present invention is not restricted to the following speculation. In this specification, in the following, a "pore connecting agent having a combustion decomposition temperature of 300° C. or higher and less than 450° C." is also simply called a "pore connecting agent". A "slurry for forming a lower catalyst layer containing a precious metal precursor and alumina and/or zeolite" is simply referred to as a "slurry for forming a lower catalyst layer". Similarly, "a slurry for forming an upper catalyst layer containing a pore-connecting agent, a precious metal precursor, alumina and/or zeolite" is simply referred to as "a slurry for forming an upper catalyst layer". Also, in this specification, "X and/or Y" means including at least one of X and Y, and includes "X by itself," "Y by itself," or "X and Y combined". Moreover, in the present specification, "from X to Y" representing a range including X and Y and means "not less than X and not greater than Y".

When an exhaust gas 12 is fed to a catalyst 10, most pores of which are pores 13 of a large pore size, the exhaust gas 12 diffuses and passes through the pores 13 of the upper catalyst layer 14 very smoothly, as illustrated in FIG. 1A. For this reason, contact with the catalyst components in the upper catalyst layer 14 last for a short period (insufficient). Here, "diffusion" means that the gas spreads into the catalyst layer for a certain period of time while being in contact with the catalyst components. The term "passing" means that the gas passes through the catalyst layer without being in contact with the catalyst components. If a lower catalyst layer 15 is arranged between the upper catalyst layer 14 and the three-dimensional structure 17 and the lower catalyst layer 15 has pores 16 with a small pore size, most of the exhaust gas 12 passes through the larger pores 13 which more readily enable flow, and there is little or no contact with the catalyst components on the lower catalyst layer 15. Therefore, this type of catalyst cannot effectively oxidize exhaust gas.

Figure 1B:
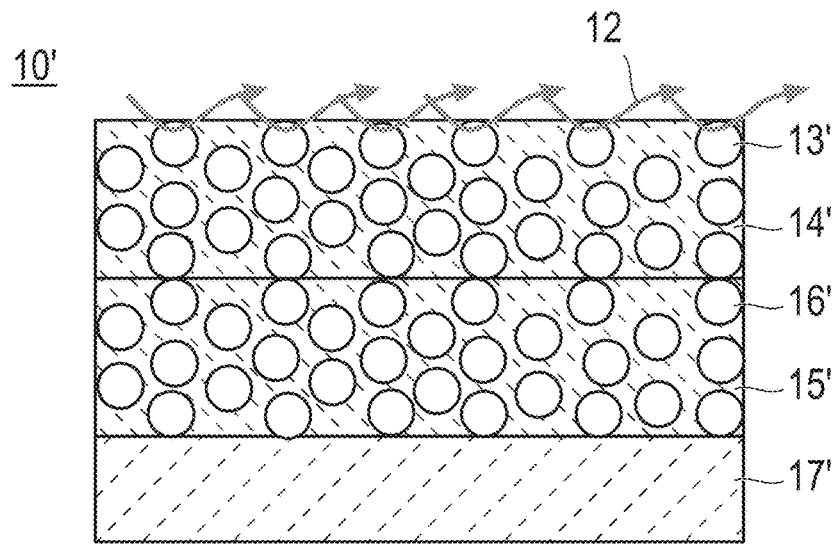

On the other hand, in the case of a catalyst 10', most pores on the upper catalyst layer are pores 13' of a small pore size; the pores 13' are from alumina or zeolite and not pores formed in the course of preparing the catalyst. Therefore, there are few or no pores 13' which are connected to one another. Therefore, when the exhaust gas 12 flows through this type of catalyst 10', the exhaust gas 12 cannot efficiently diffuse and pass through the upper catalyst layer 14', as illustrated in FIG. 1B. In particular, the exhaust gas 12 can pass through near the surface of the upper catalyst layer 14' (gas phase side), but cannot diffuse into the upper catalyst layer 14' (three-dimensional structure 17' side). Therefore, similarly, this type of catalyst also cannot effectively oxidize exhaust gas.

Figure 1C:
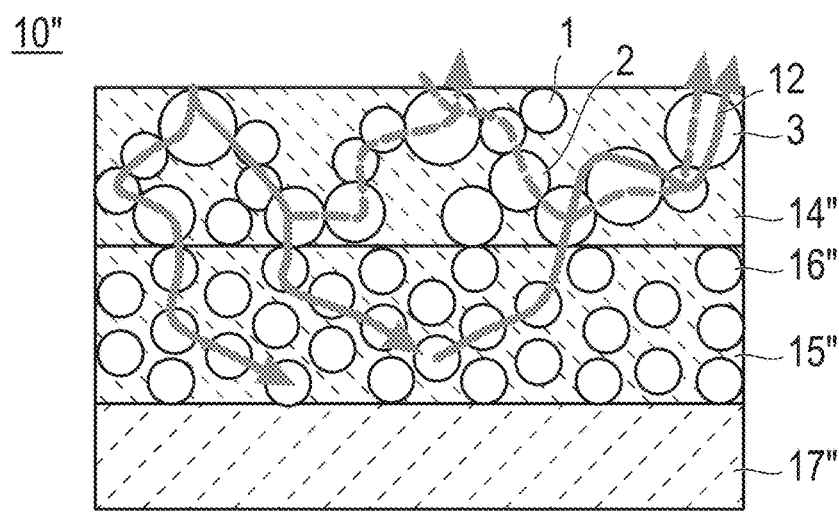

In contrast, the catalyst 10" of the present invention has, as shown in FIG. 1C, in addition to pores 3 having a large pore size and pores 1 having a small pore size, pores 2 derived from a pore connecting agent having a pore size intermediate of the pore sizes described above. Also, with the catalyst 10" of the present invention, the pores 1, 2, 3 are connected to each other in the upper catalyst layer 14" as shown in FIG. 1C. As a result, the exhaust gas 12 enters into the pores 1, 2, and 3 of the upper catalyst layer 14" and diffuses into most of the pores via the connected portions of each of the pores. In addition, the exhaust gas 12 diffuses into the upper catalyst layer 14" for an appropriate period of time because the ease of flow of the exhaust gas is different in the pores 1, 2 and 3 which have different pore sizes. Therefore, with this kind of catalyst, the exhaust gas 12 can contact catalyst components inside the upper catalyst layer 14" (three-dimensional structure 17" side) efficiently and for an appropriate period of time. As a result, the contact efficiency between the exhaust gas 12 and the catalyst components increases, and the exhaust gas 12 can be effectively oxidized. As described above, in order for the exhaust gas 12 to properly diffuse and pass through the upper catalyst layer 14", the exhaust gas 12 easily enters the pores 16" of the lower catalyst layer 15" on the three-dimensional structure 17" side and is in full contact with the catalyst components in the lower catalyst layer 15". Therefore, by using the catalyst of the present invention, exhaust gas can be oxidized effectively. In particular, with the method according to the present invention, a catalyst is obtained having an upper catalyst layer in which the pores derived from the pore connecting agent (pores 2 and 3 in FIG. 1C) are present in a more appropriate pore volume (a specific percentage of the total pore volume) and further, the pores 1, 2 and 3 are connected to each other. Therefore, the effect described above can be achieved more effectively.

In particular, in exhaust systems with a diesel particulate filter (DPF) arranged downstream of the oxidation catalyst in the exhaust stream, generating $NO_2$ from the oxidation catalyst at an appropriate temperature and timing is an important issue with regards to the goal of improving PM purification and the goal of improving $NO_x$ purification ratio in an exhaust system containing a selective catalytic reduction (SCR) catalyst comprising Cu-supporting zeolite. To address this issue, in the oxidation catalyst, HC diffuse and pass through the upper catalyst layer 14" without staying in the upper catalyst layer 14", thereby reducing the contact probability between $NO_2$ generated in the upper catalyst layer 14" and HC, and therefore suppressing the reduction of $NO_2$ to NO or $N_2$ by the HC. The NO and $O_2$ contained in the exhaust gas 12 are oxidized to $NO_2$ in the upper catalyst layer 14" by improving the contact probability with the catalyst components in the upper catalyst layer 14". Stagnation is defined as gas remaining in the catalyst layer.

The catalyst of the present invention was found to be effective in the way that the generated $NO_2$ quickly passes through and is emitted from the oxidation catalyst without reacting with HC inside the upper catalyst layer 14". In addition, the catalyst of the present invention enables more $NO_2$ to be supplied to the DPF and SCR catalysts in the later stages.

The above effect can be exhibited in the same manner regardless of the temperature of the exhaust gas. Therefore, when the catalyst of the present invention is used, it is possible to exhibit excellent exhaust gas oxidation performance (in particular NO oxidation performance) for low temperature exhaust gas of 50 to 600° C. or low temperature exhaust gas of 50 to 600° C. after the catalyst has been exposed to high temperature exhaust gas of 650 to 900° C. from an internal combustion engine for a long period of time.

Embodiments of the present invention will be described hereinafter. Note that the present invention is not restricted to only the embodiments described below.

<Exhaust Gas Oxidation Catalyst>

The exhaust gas oxidation catalyst of the present invention can efficiently oxidize CO, HC, and NO (especially CO and NO) in exhaust gas. Therefore, the catalyst can be used for the purpose of oxidizing exhaust gases emitted from both gasoline and diesel engines. Preferably, the catalyst of the present invention is used for the purpose of oxidizing exhaust gases emitted from a diesel engine.

With the catalyst of the present invention, as described above, at least a part of the upper catalyst layer has pores derived from a pore connecting agent, in particular pores formed by heat treating a coating layer comprising the pore connecting agent under specific temperature conditions. As long as at least a portion of the upper catalyst layer is obtained by the aforementioned preparation method, the catalyst according to the present invention is not restricted in terms of the preparation method for other portions of the upper catalyst layer and the lower catalyst layer. The pore size and pore distribution of the pores contained in the overall catalyst, including the lower catalyst layer, the upper catalyst layer, and other layers, can be measured by known techniques such as the mercury intrusion method. However, measuring the pore size and pore distribution for only a portion of the catalyst layer in the catalyst is impossible or impractical, even with the analytical methods known at the time of filing. Although peeling off only the upper catalyst layer from the three-dimensional structure is feasible, the pore structure of the three-dimensional structure is lost the instant this is removed. Even if each catalyst layer is measured using a known technique such as the mercury intrusion method without peeling off each catalyst layer, the pore distribution in only a section of the catalyst layers in the catalyst cannot be obtained. For example, it is impossible to have mercury intrude only into the upper catalyst layer, and intrusion is performed on both the upper and lower catalyst layers. Therefore, distinguishing the pores in the upper catalyst layer from those in the lower catalyst layer using known techniques such as the mercury intrusion method is not possible (see examples below).

Note that whether "the catalyst has pores derived from a pore connecting agent" can be detected by measuring the carbon content using a known method such as elemental analysis. In more detail, the use of pore connecting agents can be investigated by performing elemental analysis of the catalyst to determine the carbon content. Elemental analysis for the carbon (C) content in the coated upper catalyst layer, using a slurry with a pore-connecting substance, and the coated lower catalyst layer, using a slurry without a pore connecting agent, can be performed, and if the amount of C in the upper catalyst layer is greater than that in the lower catalyst layer, it is determined that the catalyst (upper catalyst layer) has pores derived from the pore connecting agent. In addition, for example, when the pore connecting agent contains carbon atoms, the presence or absence of the pore connecting agent can be examined by measuring the carbon content in the upper catalyst layer by a known method such as elemental analysis. More specifically, the amount of carbon (C) ($C_1$ amount (mass %)) in the upper catalyst layer is measured by elemental analysis. When the amount of carbon is not less than 0.04 mass %, it is determined that the upper catalyst layer has pores derived from the pore connecting agent. Note that in the present specification, the amount of carbon in the upper catalyst layer is measured according to the following method. A sample for elemental analysis is prepared by cutting the catalyst, collecting a central portion 50 to 70 mm from the end face of the catalyst near the center of the catalyst, and peeling the upper catalyst layer from the collected sample while using a microscope. Elemental analysis is performed using a fully automatic elemental analyzer Vario EL Cube (manufactured by Elementar) in accordance with the manufacturer's instructions.

The use of pore connecting agent can also be confirmed by determining the amount of C in each catalyst layer using SEM-EDS. EDS analysis for the carbon (C) content in the coated upper catalyst layer, using a slurry with a pore-connecting substance, and the coated lower catalyst layer, using a slurry without a pore connecting agent, can be performed, and if the amount of C in the upper catalyst layer is greater than that in the lower catalyst layer, it is judged that the catalyst (upper catalyst layer) has pores derived from the pore connecting agent.

Each of the constituent requirements of the catalyst of the present invention will be described in order below.

Three-Dimensional Structure

The catalyst of the present invention is composed of a precious metal and alumina and/or zeolite supported on a three-dimensional structure (refractory three-dimensional structure).

Here, the three-dimensional structure is not particularly restricted, and a refractory three-dimensional structure that is ordinarily used in this field can be similarly used. As the three-dimensional structure, for example, a refractory carrier such as a honeycomb carrier having channels (gas passage holes, cell shapes) with a triangular shape, a rectangular shape, or a hexagonal shape can be used. The three-dimensional structure is preferably an integrally molded structure, and for example, a monolith carrier, a metal honeycomb carrier, a plugged honeycomb carrier having a filter function such as a diesel particulate filter, or punched metal, or the like may be preferably used.

Examples of the three-dimensional structure preferably include materials such as cordierite, mullite, alumina, α-alumina, silicon carbide, silicon nitride, and the like, and cordierite materials (cordierite carriers) are particularly preferable. In addition, an integral structure formed using an oxidation-resistant, refractory metal including stainless steel, an Fe—Cr—Al alloy, or the like may be used.

These monolith carriers are produced using an extrusion molding method, a method of winding and solidifying a sheet-like element, or the like. The channels can be adequately used as long as the cell density (number of cells/unit cross-sectional area) is 100 to 1200 cells/square inch (1 inch=25.4 mm); the cell density is preferably 200 to 900 cells/square inch, more preferably 200 to 600 cells/square inch, and even more preferably 250 to 500 cells/square inch.

[Catalyst Layer (lower Catalyst Layer, Upper Catalyst Layer)]

The lower catalyst layer is positioned on the three-dimensional structure. Although the catalyst may have other catalyst layers between the lower catalyst layer and the three-dimensional structure, the lower catalyst layer is preferably positioned directly on the three-dimensional structure.

The lower catalyst layer includes a precious metal and alumina and/or zeolite, and may optionally include other components.

The lower catalyst layer does not have pores derived from a pore connecting agent (the lower catalyst layer is composed of precious metal, alumina and/or zeolite, and optionally other components if required). In other words, as described in detail below, the lower catalyst layer is formed using a slurry for forming the lower catalyst layer (slurry A) without a pore connecting agent (in other words, content of the pore connecting agent=0 to 5 mass %, preferably approximately 0 mass %).

The upper catalyst layer is positioned above the lower catalyst layer. The catalyst according to the present invention may have other catalyst layers between the upper catalyst layer and the lower catalyst layer, but the upper catalyst layer is preferably positioned directly on the lower catalyst layer. The catalyst according to the present invention may have other catalyst layers arranged on top of the upper catalyst layer, but the upper catalyst layer is preferably the top surface layer of the catalyst (layer in direct contact with the exhaust gas). Due to this aspect, the exhaust gas diffuses into and circulates in the upper catalyst layer (or further into the lower catalyst layer) efficiently, so that the effect of the present invention (effect of improving the contact efficiency with the exhaust gas) can be more remarkably demonstrated. The upper catalyst layer may be in the form of one layer or in the form of two or more layers.

At least a part of the upper catalyst layer has pores derived from a pore connecting agent and preferably the entire upper catalyst layer has pores derived from a pore connecting agent. Although there are no particular restrictions on the method of forming such pores, a method in which a slurry for forming an upper catalyst layer containing a pore connecting agent is applied on the lower catalyst layer to form a coating layer and then heat treated under specific temperature conditions is preferably used. In other words, a preferable form of the present invention is an exhaust gas oxidation catalyst with at least two layers, a lower catalyst layer and upper catalyst layer, formed on a three-dimensional structure, where the lower catalyst layer and upper catalyst layer independently contain a precious metal and at least one of alumina and/or zeolite, at least a part of the upper catalyst layer is formed by preparing a slurry for forming an upper catalyst layer by mixing a pore connecting agent with a combustion decomposition temperature of 300° C. or more to less than 450° C., a precious metal precursor, and at least one of alumina and/or zeolite, applying this slurry for forming an upper catalyst layer on the lower catalyst layer and then holding the workpiece in an oxygen containing gas at a temperature of higher than −170° C. to −20° C. or less relative to the combustion decomposition temperature. In a more preferable aspect of the present invention, the upper catalyst layer is formed by preparing a slurry for forming an upper catalyst layer by mixing a pore connecting agent with a combustion decomposition temperature of 300° or more to less than 450°, a precious metal precursor, and at least one of alumina and/or zeolite and coating the slurry for forming an upper catalyst layer onto the entire surface of the lower catalyst layer and then holding the workpiece in an oxygen containing gas at a temperature of higher than −170° C. to −20° C. or less relative to the combustion decomposition temperature.

The lower catalyst layer and upper catalyst layer must include a precious metal and alumina and/or zeolite, and may optionally include other components. Here, at least a part (preferably all) of the upper catalyst layer has pores derived from a pore connecting agent, in particular pores formed by heat treating the coating layer containing the pore connecting agent under specific temperature conditions. With this configuration, the catalyst of the present invention can exhibit excellent exhaust gas treatment effects (in particular CO and NO oxidation performance).

The type and content of the precious metal, alumina and zeolite in the lower catalyst layer and upper catalyst layer may be the same or different, respectively.

(Precious Metal)

The lower catalyst layer and the upper catalyst layer contain precious metal. The precious metal functions as a catalyst for the oxidation reaction of HC or CO in the exhaust gas. Here, the type of the precious metal is not particularly restricted, however, specific examples thereof include platinum (Pt) and palladium (Pd) and the like. These precious metals may be used alone, or two or more types thereof may be used in combination. Among the same, the precious metal is preferably platinum and/or palladium and more preferably platinum and palladium. Namely, according to a preferable aspect of the present invention, the precious metal is at least one of platinum and palladium. In accordance with a more preferable aspect of the present invention, the precious metals are platinum and palladium.

Here, the amount of platinum (Pt) used is not particularly restricted. Considering exhaust gas oxidation performance, the amount of platinum (Pt) used in the entire catalyst including the lower catalyst layer and upper catalyst layer, as well as other layers of the present invention, is preferably 0.02 to 20 g as metal equivalent per 1 liter of three-dimensional structure, more preferably 0.1 to 10 g, and most preferably more than 0.2 g to less than 6 g. Here, the amount of platinum (Pt) that is used in the lower catalyst layer is not particularly restricted, however, taking into consideration the exhaust gas oxidation performance, the amount is preferably from 0.01 to 10 g, more preferably from 0.05 to 5 g, and most preferably greater than 0.1 g and less than 3 g in terms of precious metal per 1 liter of the three-dimensional structure. The amount of platinum (Pt) that is used in the upper catalyst layer is not particularly restricted, however, taking into consideration the exhaust gas (particularly CO and NO) oxidation properties, the amount is preferably from 0.01 to 10 g, more preferably from 0.05 to 5 g, and most preferably greater than 0.1 g and less than 3 g in terms of precious metal per 1 liter of the three-dimensional structure.

Here, the amount of palladium (Pd) used is not particularly restricted. Considering exhaust gas oxidation performance, the amount of palladium (Pd) used in the entire catalyst including the lower catalyst layer and upper catalyst layer, as well as other layers of the present invention, is preferably 0.02 to 20 g as metal equivalent per 1 liter of three-dimensional structure, more preferably 0.1 to 10 g, and most preferably more than 0.2 g to less than 6 g. Here, the amount of palladium (Pd) that is used in the lower catalyst layer is not particularly restricted, however, taking into consideration the exhaust gas oxidation performance, the amount is preferably from 0.01 to 10 g, more preferably from 0.05 to 5 g, and most preferably greater than 0.1 g and less than 3 g in terms of precious metal per 1 liter of the three-dimensional structure. The amount of palladium (Pd) that is used in the upper catalyst layer is not particularly restricted, however, taking into consideration the exhaust gas (particularly CO and NO) oxidation properties, the amount is preferably from 0.01 to 10 g, more preferably from 0.05 to 5 g, and most preferably greater than 0.1 g and less than 3 g in terms of precious metal per 1 liter of the three-dimensional structure.

When the precious metals are platinum and palladium, the ratio of platinum and palladium (platinum:palladium (mass ratio)) is not particularly restricted. Considering the exhaust gas oxidation performance, the ratio of platinum and palladium (platinum:palladium (mass ratio)) for the entire catalyst including the lower catalyst layer and upper catalyst layer as well as other layers of the present invention, in order of preference is 50:1 to 1:1, 40:1 to 1:1, 30:1 to 1.1:1, 20:1 to 1.3:1, and 5:1 to 1.5:1. In addition, the ratio of platinum and palladium in the lower catalyst layer (platinum:palladium (mass ratio)), with consideration for exhaust gas oxidation performance, in order of preference is 50:1 to 1:1, 40:1 to 1:1, 30:1 to 1.1:1, 20:1 to 1.3:1, or 10:1 to 1.5:1. The CO and NO oxidation efficiency can be improved as the range of the ratio of platinum and palladium falls within the more preferable ranges described above. The ratio of platinum and palladium in the upper catalyst layer (platinum:palladium (mass ratio)), with consideration for exhaust gas oxidation (in particular CO, NO) performance, in order of preference is 50:1 to 1:1, 40:1 to 1:1, 30:1 to 1.1:1, 20:1 to 1.3:1, or 10:1 to 1.5:1. The CO and NO oxidation efficiency can be improved as the range of the ratio of platinum and palladium falls within the more preferable ranges described above.

The precious metal precursor (precious metal starting material) is not particularly restricted, and starting materials used in this field such as water-soluble precious metal salts and precious metal complexes can be used. These may be modified and used in accordance with the method of preparing the catalyst.

Specifically, examples of platinum (Pt) starting materials (platinum precursors) include halides such as platinum chloride; platinum nitrates, dinitrodiammine salts, tetraammine salts, hexaammine salts, ammonium salts, amine salts, bisethanolamine salts, bisacetylacetonate salts, carbonates, hydroxides, oxides, and the like. Among the same, nitrates (platinum nitrate), dinitrodiammine salts (dinitrodiammine platinum), chlorides (platinum chloride), tetraammine salts (tetraammine platinum), hexaammine salts (hexaammine platinum), and hexahydroxo acid salts are preferable. Note that, in the present invention, the platinum precursor may be a single precursor or a mixture of two or more types.

Examples of palladium (Pd) starting materials (palladium precursors) include halides such as palladium chloride; palladium nitrate, sulfate, acetate, ammonium salt, amine salt, tetraammine salt, hexaammine salt; and hydroxide and oxide. Among these, (nitrates (palladium nitrate), tetraammine salts (tetraammine palladium), hexaammine salts (hexaammine palladium), and hydroxides are preferable. Note that, in the present invention, the palladium precursor may be a single precursor or a mixture of two or more types.

Note that when two or more types of precious metal precursors are used in combination, the total amount of the precious metal precursors is preferably an amount that allows the contents (supported amounts) of the precious metals described above to be achieved.

(Alumina)

The lower catalyst layer and the upper catalyst layer of the present invention preferably contain alumina. The alumina used in the catalyst of the present invention is not particularly restricted as long as the alumina contains an oxide of aluminum, and examples thereof include activated alumina such as γ-, δ-, η-, and κ-alumina, lanthana-containing alumina, silica-containing alumina, silica-titania-containing alumina, and silica-titania-zirconia-containing alumina. One type of alumina may be used alone, or two or more types thereof may be used in combination. Among the same, lanthana-containing alumina or silica-containing alumina is preferable from the perspective of high temperature durability, and silica-containing alumina is particularly preferable from the perspective of sulfur poisoning resistance. Note that in the present specification, an X-containing alumina means that the alumina contains aluminum at a ratio greater than half of the total amount (molar ratio in terms of metal) and contains the X component at the remaining ratio. For example, in the case of silica-titania-containing alumina, the ratio of moles of aluminum (Al) to the total moles of silicon (Si), titanium (Ti), and aluminum (Al) constituting the silica-titania-containing alumina [=Al/(Si+Ti+Al)] is greater than 0.5.

The properties of the alumina are not particularly limited, however, from the perspective of suppressing performance degradation due to exhaust gas temperatures, heat resistance, and the like, it is preferable for there to be little change in specific surface area at 700° C. or higher and preferably 1,000° C. or higher. Considering the above, the melting point of the alumina is preferably not lower than 1,000° C., more preferably from 1,000 to 3,000° C., and even more preferably from 1,500 to 3,000° C.

In addition, the BET specific surface area of the alumina is not particularly restricted, however, from the perspective of supporting precious metal, the BET specific surface area is preferably from 50 to 750 m$^2$/g and more preferably from 90 to 420 m$^2$/g. With this specific surface area, a sufficient amount of precious metal can be supported on the alumina, making it possible to increase the contact area between the precious metal and the exhaust gas as well as adsorb reactants. As a result, nitric oxide oxidation performance can be further improved.

The shape of the alumina is not particularly limited, and any shape such as granular, particulate, powdery, cylindrical, conical, prismatic, cubic, pyramidal, or amorphous, for example, may be used, however, the alumina is preferably granular, particulate, or powdery and more preferably powdery. When the alumina is granular, particulate, or powdery, the average secondary particle size of the alumina is preferably 5 to 155 μm and more preferably 21 to 89 μm. Within this type of range, the precious metal can be efficiently supported on the alumina surface. The size of the alumina described above is set to the size of the starting alumina. Therefore, for example, when a slurry containing alumina of a size in the range described above is wet milled, as described in the examples, the size of the alumina after wet milling will be smaller than the size before wet milling (in other words, the size of the alumina in the catalyst layer will be smaller and in some cases outside the range described above). In the present specification, the average secondary particle size of alumina and zeolite can be measured using a laser diffraction/scattering particle size distribution analyzer such as LA-920 (manufactured by HORIBA, Ltd.).

The amount of alumina contained (supported amount) is not particularly restricted. The content (supported amount) of alumina in the entire catalyst including the lower catalyst layer and upper catalyst layer and other layers of the present invention is preferably 10 to 300 g, and more preferably 30 to 200 g per 1 L of three-dimensional structure. In addition, the content (supported amount) of alumina in the lower catalyst layer is not particularly restricted, however, the content is preferably from 5 to 150 g and more preferably from 15 to 100 g per 1 L of the three-dimensional structure. The content (supported amount) of alumina in the upper catalyst layer is not particularly restricted, however, the content is preferably from 5 to 150 g and more preferably from 15 to 100 g per 1 L of the three-dimensional structure. When the content of alumina per 1 L of the three-dimensional structure is greater that the lower limit described above, the precious metal can be sufficiently dispersed on the alumina, and a catalyst that is more sufficiently durable can be obtained. On the other hand, when the content of alumina is at the upper limit described above or less, the contact between the precious metal and the exhaust gas is favorable, and exhaust gas purification performance can be sufficiently exhibited.

Zeolite

The lower catalyst layer of the present invention preferably includes zeolite. In other words, in a particularly preferred form of the present invention, the lower catalyst layer according to the present invention includes alumina and zeolite. The upper catalyst layer according to the present invention may or may not contain zeolite, and preferably does not contain zeolite. In other words, in a particularly preferred form of the invention, the upper catalyst layer according to the present invention contains alumina and is substantially free of zeolite (in particular, zeolite content=0 to 5 mass %, preferably approximately 0 mass %).

The zeolite (hydrous aluminosilicates) used in the catalyst of the present invention can adsorb hydrocarbons (HC) in the exhaust gas. The type of zeolite is not particularly restricted, and either a natural or synthetic zeolite may be used. Specifically, A-type, X-type, Y-type, L-type, beta-type (BEA-type), ZSM-type, CHA-type, ferrierite-type, linde-type, faujasite-type, MCM-22-type, mordenite-type, or the like can be used.

In addition, the BET specific surface area of the zeolite is not particularly limited, however, from the perspective of the adsorption of hydrocarbons (HC) in the exhaust gas, the BET specific surface area is preferably from 320 to 830 m$^2$/g and more preferably from 390 to 830 m$^2$/g. With this specific surface area, HC in the exhaust gas can be sufficiently adsorbed.

The shape of the zeolite is not particularly restricted, and any shape such as granular, particulate, powdery, cylindrical, conical, prismatic, cubic, pyramidal, or amorphous may be used, for example, however, the zeolite is preferably granular, particulate, or powdery and more preferably powdery. When the zeolite is granular, particulate, or powdery, the average primary particle size of the zeolite is preferably from 5 to 20 nm and more preferably from 5 to 10 nm. In addition, the average secondary particle size of the zeolite is preferably from 0.3 to 8.1 μm and more preferably from 0.4 to 3.7 μm. The size of the zeolite is the same as that of alumina described above, but the size of the zeolite is taken to be the size of the starting zeolite. Therefore, for example, when a slurry containing zeolite of a size in the range described above is wet milled, as described in the examples, the size of the zeolite after wet milling will be smaller than the size before wet milling (in other words, the size of the zeolite in the catalyst layer will be smaller and in some cases outside the range described above). Within this range, HC in the exhaust gas can be sufficiently adsorbed. Note that in the present specification, the shape and average primary particle size of the zeolite can be measured by a transmission electron microscope (TEM).

The amount of zeolite contained (supported amount) is not particularly restricted. The content (supported amount) of zeolite in the entire catalyst, including the lower catalyst layer and upper catalyst layer of the present invention, as well as the other layers, is preferably from 0 to 300 g, more preferably from 0 to 100 g, and even more preferably 0 g or more to less than 60 g per 1 liter of three-dimensional structure. The content of zeolite in the lower catalyst layer is not particularly limited, but is preferably from 0 to 300 g, more preferably from 0 to 100 g, even more preferably 0 g or more to less than 60 g, and particularly preferably from more than 5 g to less than 50 g per 1 L of three-dimensional structure. When the upper catalyst layer contains zeolite, the content of zeolite in the upper catalyst layer is not particularly restricted, but is preferably 0 to 300 g, more preferably 0 g or more and less than 100 g, and even more preferably 0 to 60 g per 1 L of three-dimensional structure. Within the range described above, HC in the exhaust gas can be sufficiently adsorbed.

When the catalyst according to the present invention contains alumina and zeolite, the ratio of alumina and zeolite is not particularly restricted. Specifically, the ratio (mass ratio) of alumina to zeolite in the overall catalyst including the lower catalyst layer and upper catalyst layer of the present invention, as well as the other layers, is preferably 10:0.5 to 1:10, more preferably 10:1 to 10:20, and most preferably 10:1 to 10:10. The ratio (mass ratio) of alumina and zeolite in the lower catalyst layer is not particularly restricted, but is preferably 10:0.5 to 1:10, more preferably 10:1 to 10:20, and most preferably 10:1 to 10:10. When the upper catalyst layer includes zeolite, the ratio (mass ratio) of alumina and zeolite in the upper catalyst layer is not particularly restricted, but is preferably 10:0.5 to 1:10, more preferably 10:1 to 10:20, and most preferably 10:1 to 10:10. With this ratio, alumina and zeolite can be wash-coated onto the three-dimensional structure. This increases the contact area between the catalyst components and the exhaust gas, and also allows the zeolite to sufficiently adsorb HC in the exhaust gas. As a result, HC and NO are separated and the oxidation performance of NO and HC can be further improved.

Other Additional Components

The catalyst according to the present invention may further contain other additional components in addition to the precious metal and alumina and/or zeolite as long as these additional components do not diminish the effect of the catalyst of the present invention. Here, the other additional components are not particularly limited, and components which can ordinarily be used in this field can be similarly used. Specific examples include alkali metals, alkali earth metals, rare earth metals, or oxides or sulfides thereof.

Examples of alkali metals include lithium, sodium, potassium, rubidium, and cesium; and potassium is preferable. Examples of alkali earth metals include calcium, strontium, and barium; and barium is preferable. Here, alkali metals and alkali earth metals may each be incorporated alone or in the form of a mixture of two or more types thereof, or at least one type of alkali metal and at least one type of alkali earth metal may be combined and incorporated. The content (supported amount) of the alkali metal is not particularly restricted but is preferably from 0.5 to 40 g, more preferably from 1 to 25 g, and particularly preferably from 3 to 18 g per 1 L of the three-dimensional structure in terms of oxide. In addition, the content (supported amount) of the alkali earth metal is not particularly restricted but is preferably from 0.5 to 40 g, more preferably from 1 to 25 g, and particularly preferably from 3 to 18 g per 1 L of the three-dimensional structure in terms of oxide.

The rare earth metal is not particularly restricted, however, examples thereof include lanthanum (La), neodymium (Nd), yttrium (Y), scandium (Sc), and praseodymium (Pr). Among the same, lanthanum, neodymium, yttrium, and praseodymium are preferable, and lanthanum and praseodymium are more preferable. The rare earth metal may be contained alone, or two or more types thereof may be contained in combination. In addition, the rare earth metal may be in the form of a metal, or may be in the form of a sulfide.

The content (supported amount) of rare earth metals is not particularly restricted. The content (supported amount) of the rare earth metals in the entire catalyst including the lower catalyst layer and upper catalyst layer and the other layers of the present invention is preferably 0.5 to 40 g, more preferably 1 to 25 g, and particularly preferably 2 to 12 g as oxide equivalent per 1 liter of three-dimensional structure. The content of the rare earth metal in the lower catalyst layer is not particularly restricted, but is preferably 0.25 to 20 g, more preferably 0.5 to 12.5 g, and particularly preferably 1 to 6 g as oxide equivalent per 1 L of the three-dimensional structure. The content of the rare earth metal in the upper catalyst layer is not particularly restricted, but is preferably 0.25 to 20 g, more preferably 0.5 to 12.5 g, and particularly preferably 1 to 6 g as oxide equivalent per 1 L of the three-dimensional structure.

Pore Connecting Agent

The pore connecting agent enables the formation of pores derived from the pore connecting agent in the upper catalyst layer. The pore size distribution of the upper catalyst layer can be appropriately controlled by the type of pore connecting agent and the pore connecting conditions (especially combustion decomposition temperature and pore connecting temperature). In the upper catalyst layer, most of the pores with a small pore size (hereinafter also referred to as pore 1) are assumed to usually be pores present in the alumina and/or zeolite. On the other hand, when the coating layer of the slurry containing the pore connecting agent is heat treated in the pore connecting process step described below, the pore connecting agent combusts, generating a gas mass, and pores larger than the pores present in the alumina and/or zeolite (hereinafter also referred to as pores 2) and pores larger than pores 2 (hereinafter also referred to as pores 3) are formed in the upper catalyst layer. Next, when the coating layer after the pore connecting process is subjected to the calcining process described below, the pore connecting agent combusts at once to generate a gas mass, and large pores (pores 3) are further formed in the upper catalyst layer. By incorporating a pore connecting agent into the slurry, pores (pores 2 and 3) that are larger than the pores (pores 1) present in the alumina and zeolite can be efficiently formed in the (h) pore connecting process and (i) calcining process described below. Since the pores 2 and 3 are formed by combustion of the pore connecting agent, the pores 2 and 3 in the upper catalyst layer are connected to each other and to the pores 1. Note that that above is an assumption and the present invention is not restricted to this assumption.

Note that whether "the catalyst has pores (connected pores) derived from a pore connecting agent" can be detected by a known method such as elemental analysis. For example, when the pore connecting agent contains carbon atoms, the presence or absence of the pore connecting agent can be examined by measuring the carbon content in the catalyst by a known method such as elemental analysis. More specifically, the amount of carbon (C) ($C_1$ amount (mass %)) in the catalyst is measured by elemental analysis. When the amount of carbon is not less than 0.04 mass %, it is determined that the catalyst has pores derived from the pore connecting agent. Note that in the present specification, the amount of carbon in the catalyst is measured according to the following method. A sample for elemental analysis is prepared by cutting the catalyst, collecting a central portion 50 to 70 mm from the end face of the catalyst near the center of the catalyst, and peeling the upper catalyst layer from the collected sample while using a microscope. Elemental analysis is performed using a fully automatic elemental analyzer Vario EL Cube (manufactured by Elementar) in accordance with the manufacturer's instructions.

In what is described above, the pores 1 are not particularly restricted, but normally have a peak at a pore size at 0.001 μm or more to 0.1 μm or less (preferably more than 0.007 μm to less than 0.017 μm) in a pore size distribution graph measured using the mercury intrusion method. In a pore size distribution graph measured by the mercury intrusion method, the pores 2 are not particularly restricted but normally have a peak at a pore size of 0.2 μm or more to less than 1.8 μm (preferably more than 0.4 μm to less than 1.4 μm, more preferably more than 0.5 μm to less than 1.3 μm, more preferably 0.6 μm or more to less than 1.2 μm, particularly preferably 0.80 μm or more to less than 1.15 μm). In a pore size distribution graph measured by the mercury intrusion method, the pores 3 are not particularly restricted but usually have a peak at a pore size of 1.5 μm or more to less than 5.0 μm (preferably more than 1.7 μm to less than 4.5 μm, more preferably more than 2.1 μm to less than 3.5 μm). In the present specification, a "peak" is a peak in a pore size distribution (differential pore size distribution) graph obtained by plotting a value (dV/d(log D)) equal to the differential pore volume (dV) divided by the differential value (d(log D)) of the logarithm of the pore size (D) with respect to D, and the log differential pore volume at this peak is greater than 2.5% of the total pore volume. Therefore, cases in which the log differential pore volume is not greater than 2.5% of the total pore volume are not included in the term "peak". In addition, in this specification, "pore size in a pore size distribution graph measured by the mercury intrusion method" means that the pore size corresponding to the peak in the pore size distribution graph described above is determined using the method described in the following section—Pore Size Distribution Measurement.

The pore connecting agent has a combustion decomposition temperature of not lower than 300° C. and lower than 450° C. Here, when the combustion decomposition temperature of the pore connecting agent is lower than 300° C., the evaporation of water which could not be removed in the drying process (g) described below and the combustion of the pore connecting agent occur simultaneously, and thus pores 2 and 3 are not appropriately formed. In addition, when the combustion decomposition temperature of the pore connecting agent is 450° C. or higher, the decomposition of nitrates and the combustion of organic components occur simultaneously and in parallel because the combustion decomposition temperature of the pore connecting agent and the calcining temperature in the calcining process (i) are close to one another. For this reason, the pores 2 and 3 are not appropriately formed. When considering a more appropriate formation of the pores 2, 3 (ease of control), ease of operation, and the like, the combustion decomposition temperature of the pore connecting agent is preferably 310 to 430° C., more preferably 320° C. or more to less than 400° C., and particularly preferably more than 350° C. to less than 390° C. When the combustion decomposition temperature is within the range described above, the temperature is close to the combustion decomposition temperature of other organic components in the slurry, and the connecting of pores (voids) progresses more efficiently. The pore connecting agent having such a combustion decomposition temperature is not restricted to the following, however, examples include polymethylmethacrylate (combustion decomposition temperature: 373° C.), rice starch (combustion decomposition temperature: 320° C.), and melamine cyanurate. Among the same, polymethylmethacrylate and rice starch are preferable, and polymethylmethacrylate is more preferable. Here, the combustion decomposition temperature can be measured by a known method but is preferably measured using TG-DTA (Thermogravimetry-Differential Thermal Analysis). In the present specification, the combustion decomposition temperature is measured by the method described below.

The average particle size of the pore connecting agent is not in particular restricted, but is one of the most important factors for obtaining suitable formation of pores 2 and 3 (pore size distribution) in the upper catalyst layer. The average particle size of the pore connecting agent is preferably more than 0.4 μm, more preferably greater than 1 μm, even more preferably not less than 2 μm, and particularly preferably not less than 3 μm. The upper limit of the average particle size of the pore connecting agent is preferably less than 15 μm, more preferably less than 10 μm, even more preferably 6 μm or less, and particularly preferably 5 μm or less in order to obtain a pore size distribution suitable for the present invention. Namely, in a preferable aspect of the present invention, the average particle size of the pore connecting agent is more than 0.4 μm to less than 15 μm. In a more preferable aspect of the present invention, the average particle size of the pore connecting agent is greater than 1 μm and less than 10 μm. In an even more preferable aspect of the present invention, the average particle size of the pore connecting agent is not less than 2 μm and not greater than 6 μm (in particular, not less than 3 μm and not greater than 5 μm). Note that the average particle size of the pore connecting agent described above is determined by randomly selecting arbitrary particles from a scanning electron microscope image, measuring the diameters of 100 particles, and then calculating the number average thereof.

The amount (added amount) of the pore connecting agent is not in particular restricted, but is one of the most important factors for obtaining suitable pore 2 and 3 formation (pore size distribution) in the upper catalyst layer. The amount of the pore connecting agent is preferably 15% mass % or less, and more preferably 10 mass % or less on a solid content basis, relative to the total solid content in the upper catalyst layer. The "total solid content in the upper catalyst layer" described above is intended to be the total solid content when the coating layer of the slurry for forming an upper catalyst layer is heated to 1,000° C., and includes precious metal (metal state), alumina and/or zeolite, and other additional components as necessary. The state of the other components at 1,000° C. varies with each component, but they are normally present in an oxide or sulfide state. The heating is performed in an air atmosphere. The lower limit of the content of the pore connecting agent in the slurry is not particularly restricted, but is usually 1 mass % or more, preferably 2 mass % or more, in terms of solids, relative to the total solid content in the upper catalyst layer. In other words, in a preferred aspect of the present invention, the pore connecting agent is mixed at a ratio (in terms of solid content) of 1 mass % or more to 15 mass % or less of the total solid content in the upper catalyst layer. In a more preferred aspect of the present invention, the pore connecting agent is mixed at a ratio (in terms of solid content) of 2 mass % or more to 10 mass % or less of the total solid content in the upper catalyst layer. Alternatively, the amount of the pore connecting agent used (added amount) is such that the content of the pore connecting agent is preferably 15 mass % or less, and more preferably 10 mass % or less, in terms of solid content of in the slurry for forming an upper catalyst layer. Note that the lower limit of the content of the pore connecting agent in the slurry is not particularly restricted, however, the content is ordinarily not less than 1 mass % and preferably not less than 2 mass %. Namely, in a preferable aspect of the present invention, the pore connecting agent is mixed at a ratio such that the content of the pore connecting agent in the slurry is 1 mass % or more to 15 mass % or less in terms of solid content. In a more preferable aspect of the present invention, the pore connecting agent is mixed at a ratio such that the content of the pore connecting agent in the slurry is 2 mass % or more to 10 mass % or less in terms of solid content. With this amount, pores 2 and 3 of suitable size can be formed more easily and with appropriate pore volume based on the pore connecting agent. In addition, the pores 1, 2, and 3 can connect to one another more easily. The presence of such pores 1, 2, and 3 can be confirmed, for example, by determining the pore size distribution of the catalyst using "pore size distribution measurement" method below.

Pore Size Distribution Measurement

The pore size distribution (differential pore size distribution) of each catalyst is determined by plotting a mercury intrusion graph at a measurement pressure of 1 to 60,000 psia (corresponding to a measured pore size of 0.001 to 1,000 μm) after decompression for one hour at 200° C. Here, the mercury intrusion method is based on the law of capillarity, and in the case of mercury and cylindrical pores, this law is expressed by the formula: $D=-(1/P)4\gamma \cos \delta$ (where D represents the pore diameter (μm); P represents the measured pressure (psia); γ represents the surface tension (dyn/cm); and κ represents the contact angle (°)). Namely, the mercury intrusion method measures the volume of mercury penetrating into the pores as a function of the measured pressure P. The pore size distribution is the distribution of D (pore diameter) calculated as a function of P (measured pressure). The total pore volume is a value equal to the cumulative value of the pore volume into which mercury is pressed to the maximum pressure at the time of measurement (cc(mL)) divided by the catalyst mass (g). In addition, the average pore size (diameter) is the average value of D calculated as a function of P. Note that the surface tension of mercury is 484 dyn/cm, and the contact angle is 130°.

The average thickness of the upper catalyst layer and lower catalyst layer can be measured using cross-sectional observation of the refractory three-dimensional structure supporting the catalyst using a scanning electron microscope or microscope. The average thickness of the catalyst layer when a slurry containing the pore connecting agent is coated onto the three-dimensional structure should be thicker than the average thickness of the catalyst layer when a slurry not containing the pore connecting agent is coated onto a catalyst which supports the same materials in the same amounts, even if the supported amount of catalyst components is the same. The thickness of the entire catalyst layer, including the upper catalyst layer and lower catalyst layer, is preferably from 50 μm to 600 μm, more preferably from 110 μm to 350 μm, and even more preferably from 170 μm to 320 μm. The average thickness of the upper catalyst layer is preferably 25 μm to 300 μm, more preferably 30 μm to 100 μm, and even more preferably 40 μm to 80 μm. The average thickness of the lower catalyst layer is preferably 25 μm to 300 μm, more preferably 80 μm to 250 μm, and even more preferably 130 μm to 240 μm.

In addition, the use of pore connecting agents can be detected by performing elemental analysis of the catalyst to determine the carbon content (C amount). Elemental analysis of the amount of carbon (C) in the coated upper catalyst layer, using a slurry for forming an upper catalyst layer with a pore connecting agent, and the coated lower catalyst layer, using a slurry for forming the lower catalyst layer without a pore connecting agent, can be performed. The cordierite carrier coated with the catalyst components can be cut in the direction in which the coated surface is visible, and the coated catalyst component can be peeled off from the cordierite carrier using a needle or the like so that the carrier component is not included. Here, through using a microscope or the like, peeling off only the upper layer or the lower layer is feasible based on the difference in color between the upper and lower layers. The peeled powder is ground in an agate bowl to provide an analysis sample. The amount of C in the upper catalyst layer is preferably higher than that in the lower catalyst layer. For example, when the pore connecting agent contains carbon atoms, the presence or absence of the pore connecting agent can be examined by measuring the carbon content in the upper catalyst layer by a known method such as elemental analysis. In further detail, the amount of carbon (C) in the upper catalyst layer ($C_1$ amount (mass %)) is measured using elemental analysis for the analysis sample prepared as described above. When the amount of carbon is not less than 0.04 mass %, it is determined that the upper catalyst layer has pores derived from a pore connecting agent. Elemental analysis is performed using a fully automatic elemental analyzer Vario EL Cube (manufactured by Elementar) in accordance with the manufacturer's instructions.

The use of pore connecting agents can also be detected by determining the amount of C in each catalyst layer using SEM-EDS. EDS analysis of the amount of carbon (C) in the coated upper catalyst layer, using a slurry for forming an upper catalyst layer with a pore connecting agent, and the coated lower catalyst layer, using a slurry for forming the lower catalyst layer without a pore connecting agent, can be performed, and the amount of C in the upper catalyst layer is preferably greater than the amount of C in the lower catalyst layer.

Preparation Method for the Exhaust Gas Oxidation Catalyst

The exhaust gas oxidation catalyst of the present invention can be produced by referring to known methods as appropriate, but as described above, the upper catalyst layer of the catalyst of the present invention has pores derived from a pore connecting agent. In order to obtain such a structure, it is important to apply a slurry containing a pore connecting agent having a specific combustion decomposition temperature (not lower than 300° C. and lower than 450° C.) in addition to the catalyst components to the lower catalyst layer and then holding (heat treating) the workpiece at a specific temperature difference relative to the combustion decomposition temperature described above.

In other words, the present invention provides a method of preparing the exhaust gas oxidation catalyst, composed of:

preparing a slurry for forming a lower catalyst layer by mixing a precious metal precursor and alumina and/or zeolite, applying the slurry for forming a lower catalyst layer onto a three-dimensional structure, forming the lower catalyst layer containing precious metal and alumina and/or zeolite onto the three-dimensional structure, preparing a slurry for forming an upper catalyst layer by mixing a pore connecting agent with a combustion decomposition temperature of 300° C. or more to less than 450° C., precious metal, and alumina and/or zeolite, applying the slurry for forming an upper catalyst layer on the lower catalyst layer, then holding the workpiece in an oxygen containing gas at a temperature of higher than −170° C. to −20° C. or less relative to the combustion decomposition temperature, forming an upper catalyst layer containing precious metal and alumina and/or zeolite on the lower catalyst layer (second aspect). The upper catalyst layer of the present invention can be suitably formed by heat treatment under specific temperature conditions using a specific pore connecting agent.

The following describes, as a preferred aspect of the present invention, a method for preparing an exhaust gas oxidation catalyst of the present invention composed of (a) a process step for preparing a slurry for forming a lower catalyst layer, (b) a process step for coating the slurry for forming the lower catalyst layer, (c) a drying process step, (d) a calcining process step, (e) a process step for preparing a slurry for forming an upper catalyst layer, (f) a process step for coating the slurry for forming an upper catalyst layer, (g)

a drying process step, (h) a pore connecting process step and (i) a calcining process step. Note that for configurations other than the characteristic part of the present invention ((h) pore connecting process step), known methods other than those described below can be applied in the same manner or with appropriate modifications, and the present invention is not restricted by the preferable aspects described below.

(a) Process Step for Preparing a Slurry for Forming a Lower Catalyst Layer

In this process step, the precious metal precursor, alumina and/or zeolite, and other additional components, if necessary, are mixed to prepare a slurry for forming the lower catalyst layer [to prepare a slurry for forming the lower catalyst layer containing starting materials that will eventually become each catalyst component (precious metal, alumina, zeolite, and the like)]. The slurry for forming the lower catalyst layer is prepared by mixing the starting materials of each of the catalyst components in an aqueous medium and wet milling. Note that ordinary materials used in this field can be appropriately used as the starting materials of each of the catalyst components. For example, since the alumina or zeolite are the same as described above (type, supported amount, and the like), a description thereof is omitted here. In addition, when the catalyst of the present invention contains other additional components, since each of the additional components is the same as described above (type, supported amount, and the like), a description thereof is omitted here. Note that, since the descriptions of the, the precious metal precursor, alumina, zeolite, and other additional components are the same as above, descriptions thereof are omitted here. A pore connecting agent is not added to the slurry for forming the lower catalyst layer.

As an aqueous medium, for example, water (purified water, ultrapure water, deionized water, distilled water, or the like), a lower alcohol such as ethanol or 2-propanol, an organic alkaline aqueous solution, or the like can be used. Among these, water or a lower alcohol is preferably used, and water is more preferably used. The amount of the aqueous medium is not particularly restricted, however, the amount is preferably such that the ratio of the solid content in the slurry for forming the lower catalyst layer (solid content mass concentration) is 5 to 60 mass % and more preferably 10 to 50 mass %.

Here, the order in which the precious metal precursor, alumina and/or zeolite, other additional components, and the like are added is not particularly restricted, and the components may be added collectively to the aqueous medium or may be added separately in an appropriate order. For example, alumina can be added to the aqueous medium and stirred for 5 minutes to 24 hours, then the precious metal precursor can be added and stirred for 5 minutes to 24 hours, and then zeolite or other additional components can be added. Alternatively, the zeolite can be added to the aqueous medium, stirred for 5 minutes to 24 hours, then the precious metal precursor can be added, stirred for 5 minutes to 24 hours, and then alumina or other additional components can be added (method B). Alternatively, a precious metal precursor, alumina and/or zeolite and other additional components may be added to the aqueous medium and stirred for 5 minutes to 24 hours (method C). In the above, the pH of the mixture (slurry) after each starting material is added is preferably adjusted to 6 or higher and preferably 7 or higher and less than 8. Therefore, when the pH of the mixture (slurry) after each addition step is 8 or higher, the pH is preferably adjusted to lower than 8 using an acid such as hydrochloric acid, sulfuric acid, nitric acid, or carbonic acid. In addition, when the pH of the mixture (slurry) after each addition step is lower than 6, the pH is adjusted to 6 or higher and preferably 7 or higher using a base such as ammonia, sodium hydroxide, potassium hydroxide, sodium carbonate, or potassium carbonate.

Next, the slurry obtained in this way is wet milled. Here, wet milling can be performed by a known method using a ball mill or a bead mill, for example. In addition, the wet milling conditions are not particularly restricted. For example, wet milling is preferably performed for 5 minutes to 5 hours at a rotational speed of 50 to 5,000 rpm. Wet milling under these conditions results in an average particle size of the solids of roughly 5 μm (or less). Note that the stirring described above may also be performed by wet milling.

(b) Process Step for Coating the Slurry for Forming the Lower Catalyst Layer

In this process step, the slurry for forming the lower catalyst layer obtained in the (a) process step for preparing a slurry for forming a lower catalyst layer described above is applied to the three-dimensional structure. With regards to the method of applying the slurry for forming the lower catalyst layer onto the three-dimensional structure, a known method such as wash coating or the like can be employed as appropriate. The applied amount of the slurry may be appropriately set by a person skilled in the art according to the amount of solid contents in the slurry and the thickness of the catalyst layer to be formed. The applied amount of the slurry is preferably an amount such that the contents of the precious metal, alumina and/or zeolite, and any other additional components (if any) are as described above.

(c) Drying Process Step

The drying process step is a process for drying the coating layer of the slurry for forming the lower catalyst layer on the three-dimensional structure which was applied during the (b) process step of coating the slurry for forming the lower catalyst layer described above.

In the drying process, the coating of the slurry for forming the lower catalyst layer applied to the three-dimensional structure is dried for 5 minutes to 10 hours and preferably 15 minutes to 3 hours at a temperature of preferably 50 to 170° C. and more preferably 70 to 150° C.

(c) Calcining Process Step

In this process step, the coating layer is calcined after (c) described above. As a result, the catalyst components (precious metal, alumina, zeolite, and the like) adhere to the three-dimensional structure. In addition, nitrogen containing components, hydrogen-containing components, and carbon-containing components remaining in the catalyst layer are removed.

Here, the calcining conditions are not particularly restricted. For example, calcining is performed in air at a temperature of 440° C. to 800° C., preferably 450° C. to 610° C., and more preferably 450° C. to 555° C. for 10 minutes to 3 hours and preferably from 15 minutes to 1 hour. Under such conditions, the catalyst components (precious metal, alumina, zeolite, and the like) can efficiently adhere to the three-dimensional structure.

In addition, calcining is preferably performed while circulating a gas such as air. This operation also allows for more efficient removal of organic components. Here, the rate at which the gas is circulated (gas flow rate) is not particularly restricted but is preferably not less than 0.1 m/sec and more preferably from 0.2 to 1.2 m/sec.

From these processes, the lower catalyst layer is formed on the three-dimensional structure.

(e) Process Step for Preparing a Slurry for Forming an Upper Catalyst Layer

In this process step, a slurry for forming an upper catalyst layer is prepared by mixing a pore connecting agent, a precious metal precursor, alumina and/or zeolite, and, if necessary, other additional components [a slurry for forming an upper catalyst layer containing starting materials that ultimately form each of the catalyst components (precious metal, alumina, zeolite, and the like) and a pore connecting agent is prepared]. The slurry for forming an upper catalyst layer is prepared by mixing and wet milling the starting materials of each of the catalyst components and the pore connecting agent in an aqueous medium. Note that ordinary materials used in this field can be appropriately used as the starting materials of each of the catalyst components. For example, since the alumina or zeolite are the same as described above (type, supported amount, and the like), a description thereof is omitted here. In addition, when the catalyst of the present invention contains other additional components, since each of the additional components is the same as described above (type, supported amount, and the like), a description thereof is omitted here. Note that, since the descriptions of the pore connecting agent, the precious metal precursor, alumina, zeolite, and other additional components are the same as above, descriptions thereof are omitted here.

As an aqueous medium, for example, water (purified water, ultrapure water, deionized water, distilled water, or the like), a lower alcohol such as ethanol or 2-propanol, an organic alkaline aqueous solution, or the like can be used. Among these, water or a lower alcohol is preferably used, and water is more preferably used. The amount of the aqueous medium is not particularly restricted, however, the amount is preferably such that the ratio of solid content in the slurry for forming an upper catalyst layer (solid content mass concentration) is 5 to 60 mass % and more preferably 10 to 50 mass %. The ratio of solid content can be calculated from the ratio of the mass of solid content remaining after calcining in air for 30 minutes at 550° C. relative to the mass of the slurry before calcining for 30 minutes at 550° C.

Here, the order in which the precious metal precursor, alumina and/or zeolite, the pore connecting agent, other additional components, and the like are added is not particularly restricted, and the components may be added collectively to the aqueous medium or may be added separately in an appropriate order. For example, alumina and/or zeolite and the pore connecting agent may be added to the aqueous medium and stirred for 5 minutes to 24 hours, the precious metal precursor may then be added and stirred for 5 minutes to 24 hours, and other additional components such as zeolite may then be added. Alternatively, alumina or zeolite may be added to the aqueous medium and stirred for 5 minutes to 24 hours, the pore connecting agent may then be added and stirred for 5 minutes to 24 hours, and after the precious metal precursor is then added and stirred for 5 minutes to 24 hours, other additional components such as zeolite or alumina may be added. Alternatively, alumina and/or zeolite may be added to the aqueous medium and stirred for 5 minutes to 24 hours, the precious metal precursor may then be added and stirred for 5 minutes to 24 hours, and after the pore connecting agent is then added and stirred for 5 minutes to 24 hours, other additional components such as zeolite or alumina may be added. Alternatively, a precious metal precursor, alumina or zeolite, other additional components, and pore connecting agent can be added to the aqueous medium and stirred for 5 minutes to 24 hours. In the above, the pH of the mixture (slurry) after each starting material is added is preferably adjusted to 6 or higher and preferably 7 or higher and less than 8. Therefore, when the pH of the mixture (slurry) after each addition step is 8 or higher, the pH is preferably adjusted to lower than 8 using an acid such as hydrochloric acid, sulfuric acid, nitric acid, or carbonic acid. In addition, when the pH of the mixture (slurry) after each addition step is lower than 6, the pH is adjusted to 6 or higher and preferably 7 or higher using a base such as ammonia, sodium hydroxide, potassium hydroxide, sodium carbonate, or potassium carbonate.

Next, the slurry obtained in this way is wet milled. Here, wet milling can be performed by a known method using a ball mill or a bead mill, for example. In addition, the wet milling conditions are not particularly restricted. For example, wet milling is preferably performed for 5 minutes to 5 hours at a rotational speed of 50 to 5,000 rpm. Wet milling under these conditions results in an average particle size of solids of roughly 5 µm (or less). Note that the stirring described above may also be performed by wet milling.

(f) Process Step for Coating the Slurry for Forming an Upper Catalyst Layer

In this process step, the slurry for forming an upper catalyst layer obtained in the (e) process step for preparing a slurry for forming an upper catalyst layer described above is applied to the lower catalyst layer formed in the (d) calcining process described above. For applying the slurry for forming an upper catalyst layer on the lower catalyst layer, a known method such as wash coating can be employed as appropriate. The applied amount of slurry may be appropriately set by a person skilled in the art according to the amount of solid matter in the slurry and the thickness of the catalyst layer to be formed. The applied amount of the slurry is preferably an amount such that the contents of the precious metal, alumina and/or zeolite, and any other additional components (if any) are as described above.

(g) Drying Process Step

In this process step, the coating layer of the slurry for forming an upper catalyst layer which is applied in process step (f) on the lower catalyst layer, which was formed by coating the slurry for forming the lower catalyst layer, is dried. In the drying process, the coating of the slurry for forming the lower catalyst layer applied to the three-dimensional structure is dried for 5 minutes to 10 hours and preferably 15 minutes to 3 hours at a temperature of preferably 50 to 170° C. and more preferably 70 to 150° C.

(h) Pore Connecting Process Step

In this process step, the coating layer of the slurry for forming an upper catalyst layer (upper catalyst precursor layer) obtained in (g) described above is heat treated (held) in air at a temperature of higher than −170° C. to −20° C. or less relative to the combustion decomposition temperature. As described above, this process causes the combustion and decomposition of the pore connecting agent and removes the pore connecting agent in the slurry for forming an upper catalyst layer coating layer (upper catalyst precursor) as a mass of gas so as to form pores 2 and 3 and to connect the pores 1, 2, and 3 to one another. On the other hand, when the drying process step is followed by the calcining process step without the pore connecting process step, the desired exhaust gas oxidation performance is not achieved because the upper catalyst layer having pores derived from the pore connecting agent cannot be obtained.

The heat treatment temperature in this process is higher than −170° C. and −20° C. or less relative to the combustion decomposition temperature. Note that the pore connecting agent starts to combust and decompose at around −50° C. of the combustion decomposition temperature. However, when the heat treatment temperature is not higher than −170° C. relative to the combustion decomposition temperature, the pore connecting agent does not combust sufficiently, and therefore, a sufficient mass of gas cannot be generated, and the pore connecting agent combusts at once in the following (i) calcining process step. Thus, mainly pores 3 are formed and pores 2 cannot be formed sufficiently. In addition, when the heat treatment temperature exceeds −20° C. relative to the combustion decomposition temperature, the pore connecting agent combusts at once, so excessively large pores are formed (pores 2 are difficult to form or are not formed at all). As a result, the exhaust gas diffusability increases too much and the amount of exhaust gas that passes through without contacting the catalyst components increases, resulting in a decrease of the exhaust gas oxidation performance (in particular the CO and NO oxidation performance). The heat treatment temperature is preferably not lower than −150° C. and not higher than −30° C., more preferably not lower than −120° C. and not higher than −40° C., and particularly preferably not lower than −100° C. and not higher than −50° C. relative to the combustion decomposition temperature. The heat treatment temperature is preferably 180 to 400° C., more preferably 200 to 350° C., and particularly preferably 220 to 320° C. Through combustion of the pore connecting agent at this heat treatment temperature, pores 2 and 3 can be appropriately formed in the upper catalyst layer. The heat treatment time is not particularly restricted, but is preferably from 10 minutes to 3 hours, and preferably from 15 minutes to 1 hour. Through combustion of the pore connecting agent over this amount of heat treatment time, pores 2 and 3 can be appropriately formed in the upper catalyst layer.

The heat treatment in the pore connecting process step is carried out in an oxygen-containing gas and is preferably carried out while the oxygen-containing gas is flowing. The oxygen-containing gas is not particularly restricted, and includes air, oxygen gas, and a mixture of oxygen gas and inert gas (for example nitrogen gas, argon gas). This operation allows organic components (in particular, the pore connecting agent) to be removed more efficiently. Here, the flow rate (gas flow rate) of oxygen-containing gas is not particularly limited but is preferably not less than 0.1 m/sec and more preferably 0.2 to 1.2 m/sec.

(i) Calcining Process Step

In this process step, the coating layer after undergoing the (h) pore connecting process step described above is calcined. Here, the catalyst components (precious metal, alumina, zeolite, and the like) adhere to the top of the lower catalyst layer. In addition, nitrogen containing components, hydrogen-containing components, and carbon-containing components remaining in the catalyst layer are removed.

Here, the calcining conditions are not particularly restricted. For example, calcining is performed in air at a temperature of 440° C. to 800° C., preferably 450° C. to 610° C., and more preferably 450° C. to 555° C. for 10 minutes to 3 hours and preferably from 15 minutes to 1 hour. Under these conditions, the catalyst components (precious metal, alumina, zeolite, and the like) can efficiently adhere to the lower catalyst layer.

In addition, calcining is preferably performed while circulating a gas such as air. This operation also allows organic components (in particular, the pore connecting agent) to be removed more efficiently. Here, the rate at which the gas is circulated (gas flow rate) is not particularly restricted but is preferably not less than 0.1 m/sec and more preferably from 0.2 to 1.2 m/sec.

From these processes, the upper catalyst layer is formed on top of the lower catalyst layer to produce the catalyst of the present invention.

The exhaust gas oxidation catalyst according to the present invention as described above can exhibit high oxidation performance for exhaust gas (hydrocarbon (HC), carbon monoxide (CO), nitrogen monoxide (NO), in particular, CO and NO) emitted from internal combustion engines, particularly diesel engines. Accordingly, the exhaust gas oxidation catalyst of the present invention is suitable for use as a catalyst for oxidizing exhaust gas emitted from a diesel engine.

Exhaust Gas Oxidation Method

The third aspect relates to a method of oxidizing exhaust gas, comprised of treating exhaust gas using the exhaust gas oxidation catalyst or a catalyst for oxidizing exhaust gas prepared using the preparation method described above. The catalyst of the present invention may be used for the purpose of oxidizing exhaust gas emitted from both gasoline and diesel engines, but is particularly suitable for use in oxidizing exhaust gas emitted from diesel engines. Hence, the following describes a method of oxidizing exhaust gases emitted from a diesel engine using a catalyst according to the present invention. Note that the present invention is not restricted by the following.

The catalyst of the present invention can exhibit high oxidation performance with regards to hydrocarbons (HC), carbon monoxide (CO), nitric oxide (NO), preferably CO and NO, and in particular NO, in exhaust gas emitted from a diesel engine. Therefore, the present invention also provides a diesel engine exhaust gas oxidation method. Such a method includes treating exhaust gas (in particular, oxidizing nitric oxide (NO) in exhaust gas) emitted from a diesel engine using the exhaust gas oxidation catalyst of the present invention. In order to measure the exhaust gas oxidation rate using a diesel engine, it is preferable to use an evaluation mode for exhaust gas regulations such as the NEDC mode, the JC08 mode, WLTC, FTP75, FTP1199, NRTC, or the NRSC mode. For example, when an evaluation is performed in the NEDC mode, the evaluation is performed in accordance with the United Nations Economic Commission for Europe, Addendum 82: Regulation No. 83. The CO and HC oxidation rates and the $NO_2$ generation rate (%) are calculated according to the following equation (I).

[Equation 1]

$$\text{CO and HC oxidation rate}[\%] = \frac{(Conc)_{in} - (Conc)_{out}}{(Conc)_{in}} \times 100 \quad \text{Formula (I)}$$

Where $(Conc)_{in}$ expresses the concentration of CO or HC gas at the catalyst inlet; and $(Conc)_{out}$ expresses the concentration of CO or HC gas at the catalyst outlet;

$$NO_2 \text{ generation rate}[\%] = \frac{(NO_2 Conc)_{out}}{(NO_x Conc)_{out}} \times 100 \quad \text{Formula (II)}$$

Where $(NO_2\ Conc)_{out}$ indicates the concentration of $NO_2$ at the catalyst outlet; and $(NO_x\ Conc)_{out}$ indicates the concentration of $NO_x$ (total of NO and $NO_2$) at the catalyst outlet.

Here, the CO concentration in the exhaust gas is not particularly restricted but is preferably from 10 to 50,000 volume ppm, more preferably from 50 to 15,000 volume ppm, and even more preferably from 50 to 5,000 volume ppm. Exhaust gas can be treated even if HC, NO are contained therein in addition to CO.

In the aspect described above, the HC concentration in the exhaust gas is not particularly restricted but is preferably from 1 to 50,000 volume ppm, more preferably from 10 to 10,000 volume ppm, and even more preferably from 50 to 1,000 volume ppm. In addition, the NO concentration in the exhaust gas is also not particularly restricted but is preferably from 1 to 10,000 volume ppm, more preferably from 10 to 5,000 volume ppm, and even more preferably from 20 to 1,000 volume ppm.

Further, exhaust gas emitted from a diesel engine contains a particulate component (particulate matter, PM). Therefore, it is preferable to use a three-dimensional structure having a filter function in order to remove this PM. Alternatively, a separate filter may be provided to remove the PM.

The space velocity (SV) of the exhaust gas may be a normal velocity, but is preferably between 1,000 and 500,000 $hr^{-1}$, and more preferably between 5,000 and 200,000 $hr^{-1}$. In addition, the gas linear velocity may be a normal velocity, however, contact is preferably made at a rate of 0.1 to 8.5 m/sec and more preferably 0.2 to 6.7 m/sec.

In addition, the catalyst of the present invention can maintain and demonstrate excellent oxidation performance (particularly CO and NO) for low temperature exhaust gases. Specifically, the catalyst of the present invention can exhibit excellent exhaust gas oxidation performance for exhaust gases at low temperatures, preferably from 50 to 600° C., more preferably from 80 to 500° C., and most preferably from 100 to 450° C. Similarly, the catalyst of the present invention can maintain and exhibit excellent oxidation performance even after exposure to high temperature exhaust gases for long periods of time. Specifically, the catalyst of the present invention can exhibit an excellent exhaust gas treating performance (in particular, NO oxidation performance) for exhaust gas having a low temperature of 50 to 600° C. after having been exposed for a long period of time to exhaust gas having a high temperature of 650 to 900° C. (in particular, including HC, CO, $NO_x$, water vapor, or the like) from an internal combustion engine. Therefore, for example, even when the exhaust gas oxidation catalyst is installed in the exhaust stream of the exhaust port of an internal combustion engine (diesel engine) and high temperature exhaust gas is allowed to flow through the exhaust stream for a long period of time, exhaust gas (particularly CO and NO) can still be efficiently oxidized.

Thus, the catalyst of the present invention described above or a catalyst produced by the method described above may be exposed to exhaust gas having a temperature of 650 to 900° C. and preferably 700 to 850° C. Further, the amount of time that the catalyst of the present invention is exposed to high temperature exhaust gas (amount of time that the exhaust gas is allowed to flow) is also not particularly limited but is, for example, 10 to 800 hours, preferably 16 to 500 hours, and more preferably 40 to 100 hours. Even after being exposed to such a high temperature exhaust gas, the catalyst of the present invention has high performance. In order to investigate the exhaust gas oxidation performance of the catalyst after being exposed to high temperature exhaust gas in this way, it is effective to subject the catalyst to treatment involving exposure to exhaust gas at 650 to 900° C. for 10 to 300 hours as thermal aging and to then evaluate the exhaust gas oxidation performance (resistance to catalyst deterioration).

Note that in the present specification, the "temperature of the exhaust gas" refers to the temperature of the exhaust gas at the catalyst inlet. Here, the "catalyst inlet" refers to a portion extending 10 cm from the catalyst end face on the exhaust gas inlet side toward the internal combustion engine side in the exhaust pipe in which the exhaust gas oxidation catalyst is installed, and also refers to the location of the center portion in the longitudinal direction (axial direction) of the exhaust pipe. In addition, in the present specification, the "catalyst bed" refers to a center portion between the catalyst end face on the exhaust gas inlet side and the catalyst end face on the exhaust gas outlet side in the exhaust pipe, and also refers to the location of the center portion of a cross section of the exhaust pipe (when the cross section of the exhaust pipe is not circular, this is the location of the center of gravity of the cross section of the exhaust pipe).

EXAMPLES

The effects of the present invention will be described using the following examples and comparative examples. However, the technical scope of the present invention is not limited to the following examples. Note that in the following examples, unless indicated otherwise, operations were performed at room temperature (25° C.). In addition, unless indicated otherwise, "%" and "parts" refer to "mass %" and "parts by mass", respectively.

Example 1

Using dinitrodiammine platinum as a Pt precursor, palladium nitrate as a Pd precursor, powdered silica-containing alumina (BET specific surface area: 180 $m^2/g$, average secondary particle size: 45 μm) as an alumina starting material, powdered beta-zeolite (silica/alumina ratio (molar ratio): 35 to 40, BET specific surface area: 582 $m^2/g$, average secondary particle size: 0.4 to 0.6 μm) as a zeolite starting material, and lanthanum oxide ($La_2O_3$) as a lanthanum oxide starting material, each starting material was weighed such that the mass ratio of Pt:Pd:silica-containing alumina ($Al_2O_3$):beta-zeolite:$La_2O_3$ was 0.83:0.42:50:27:2. After each weighed starting material was added to deionized water and stirred for 30 minutes, the pH was adjusted to 7 or higher and lower than 8 by adding nitric acid to produce a mixed dispersion a1. Next, the mixed dispersion a1 was wet milled with a ball mill for 30 minutes at a rotational speed of 200 rpm to produce a slurry A1 (solid content mass concentration=35 mass %). Note that the average secondary particle size of the solid content in the slurry A1 was 5.0 μm.

Next, the slurry A1 was wash-coated onto a cylindrical 1.3 L cordierite carrier (number of cells: 400 cells per 1 square inch of cross-sectional area) having a diameter of 118.4 mm and a length of 118 mm such that the supported amount after calcining was 80.25 g per 1 liter of the cordierite carrier. Next, after this workpiece was dried for 20 minutes at 150° C., it was calcined for one hour at 500° C. in air to obtain a precursor A having a lower catalyst layer formed on the cordierite carrier.

Next, using dinitrodiammine platinum as a Pt precursor, palladium nitrate as a Pd precursor, powdered silica-containing alumina (BET specific surface area: 180 $m^2/g$, average secondary particle size: 45 μm) as an alumina starting material, lanthanum oxide ($La_2O_3$) as a lanthanum oxide starting material, and polymethylmethacrylate (average particle size: 4 μm) as a pore connecting agent, each starting material was weighed such that the mass ratio of Pt:Pd:silica-containing alumina ($Al_2O_3$):$La_2O_3$:polymethylmethacrylate was 1.5:0.25:65:2:6.8. After each weighed starting material was added to deionized water and stirred for 30 minutes, the pH was adjusted to 7 or higher and lower than 8 by adding nitric acid to produce a mixed dispersion a2. Next, the mixed dispersion a2 was wet milled with a ball mill for 30 minutes at a rotational speed of 200 rpm to produce a slurry A2 (solid content mass concentration=26 mass %). Note, the average secondary particle size of the solid content in the slurry A2 was 5.0 μm, and the content (in terms of solid content) of the pore connecting agent was equivalent to 9.9 mass % (6.8 parts by mass) with respect to the total solid content in the upper catalyst layer (total solid content in the upper catalyst layer when heated to 1,000° C., 68.75 parts by mass).

Next, the slurry A2 was wash-coated onto the precursor A such that the supported amount after calcining was 68.75 g per 1 liter of the cordierite carrier, and this workpiece was then dried for 20 minutes at 150° C. The material was then held in air at 280° C. for 20 min (pore connecting process) to allow combustion and decomposition of the pore connecting agent. Next, this workpiece was calcined for one hour at 500° C. in air to obtain a catalyst A having a lower catalyst layer and an upper catalyst layer formed on the cordierite carrier. Note, catalyst A is composed of a lower catalyst layer containing Pt (in terms of metal)=0.83 g/L, Pd (in terms of metal)=0.42 g/L, silica-containing alumina ($Al_2O_3$) (in terms of oxide)=50 g/L, beta zeolite (in terms of oxide)=27 g/L and lanthanum oxide ($La_2O_3$) (in terms of oxide)=2 g/L, per 1 liter of cordierite support, and an upper catalyst layer containing Pt (in terms of metal)=1.5 g/L, Pd (in terms of metal)=0.25 g/L, silica-containing alumina ($Al_2O_3$) (in terms of oxide)=65 g/L and lanthanum oxide ($La_2O_3$) (in terms of oxide)=2 g/L, per 1 liter of cordierite support, formed on a cordierite support as two catalyst layers in the order from the lower catalyst layer to the upper catalyst layer.

In addition, the combustion decomposition temperature of polymethylmethacrylate (pore connecting agent) was measured to be 373° C. using the following method with a thermogravimetry-differential thermal analyzer (TG-DTA). The heat treatment temperature for the pore connecting process was −93° C. (=280−373) relative to the combustion decomposition temperature. Note that polymethylmethacrylate (pore connecting agent) began to combust at around 321° C.

Method for Measuring the Combustion Decomposition Temperature of the Pore Connecting Agent First, 30 mg of the pore connecting agent (sample) is placed on the sample pan of a TGA (manufactured by Bruker AXS, trade name: TG-DTA2020SR) through which a carrier gas (air) is circulated, and after the baseline stabilizes, the differential heat is measured when the sample undergoes combustion decomposition under conditions where the sample is heated from 25° C. to 800° C. at a rate of 10°/min under an air flow of 100 ml/min. Here, combustion decomposition refers to a state in which differential heat of 100 μV or greater per 30 mg of the sample is generated in the DTA profile of the TG-DTA measurement data, and no more differential heat is generated thereafter. The temperature at which the above state (state of maximum differential heat) is indicated is referred to as the "combustion decomposition temperature (° C.) of the pore connecting agent".

Comparative Example 1

Using the same starting materials as in Example 1, each starting material was weighed so that the mass ratio of Pt:Pd:silica-containing alumina ($AL_2O_3$):beta zeolite:$La_2O_3$:polymethylmethacrylate was 0.83:0.42:50:27:2:8. After each weighed starting material was added to deionized water and stirred for 30 minutes, the pH was adjusted to 7 or higher and lower than 8 by adding nitric acid to produce a mixed dispersion b1. Next, the mixed dispersion b1 was wet milled with a ball mill for 30 minutes at a rotational speed of 200 rpm to produce a slurry B1. In addition, the average secondary particle size of the solid content in the slurry B1 was 5.0 μm, and the content (in terms of solid content) of the pore connecting agent is equivalent to 10.0 mass % (8 mass parts) with respect to the total solid content in the upper catalyst layer (total solid content in the upper catalyst layer when heated to 1,000° C., 80.25 mass parts).

Next, this slurry B1 was wash-coated onto a cordierite carrier as in example 1 so that the supported amount after calcining was 80.25 g per 1 liter of cordierite carrier, followed by drying at 150° C. for 20 minutes. The workpiece was then held in air at 280° C. for 20 min (pore connecting process) to allow combustion and decomposition of the pore connecting agent. Next, the workpiece was calcined for hr-1alyst layer formed on the cordierite carrier.

Next, using the same starting materials as in example 1, each starting material was weighed so that the mass ratio of Pt:Pd:silica-containing alumina ($Al_2O_3$):$La_2O_3$ was 1.5:0.25:65:2. After each weighed starting material was added to deionized water and stirred for 30 minutes, the pH was adjusted to 7 or higher and lower than 8 by adding nitric acid to produce a mixed dispersion b2. Next, the mixed dispersion b2 was wet milled with a ball mill for 30 minutes at a rotational speed of 200 rpm to produce a slurry B2. Note that the average secondary particle size of the solid content in the slurry B2 was 5.0 μm. Next, the slurry B2 was wash-coated onto the precursor B such that the supported amount after calcining was 68.75 g per 1 liter of the cordierite carrier. Next, after this workpiece was dried for 20 minutes at 150° C., it was calcined for one hour at 500° C. in air to obtain a catalyst B having a lower catalyst layer and an upper catalyst layer formed on the cordierite carrier.

Comparative Example 2

Using the same starting materials as in example 1, precursor A was prepared in a similar manner.

The slurry B2 was wash-coated onto the precursor A such that the supported amount after calcining was 68.75 g per 1 liter of the cordierite carrier. Next, after this workpiece was dried for 20 minutes at 150° C., it was calcined for one hour at 500° C. in air to obtain a catalyst C having a lower catalyst layer and an upper catalyst layer formed on the cordierite carrier.

Comparative Example 3

Using the same starting materials as in example 1, precursor A was prepared in a similar manner.

Next, using the same starting materials as in comparative example 1, each starting material was weighed so that the mass ratio of Pt:Pd:silica-containing alumina ($Al_2O_3$):$La_2O_3$ was 1.5:0.25:75:2. After each weighed starting material was added to deionized water and stirred for 30 minutes, the pH was adjusted to 7 or higher and lower than 8 by adding nitric acid to produce a mixed dispersion d2. Next, the mixed dispersion d2 was wet milled with a ball mill for 30 minutes at a rotational speed of 200 rpm to produce a slurry D2. Next, the slurry D2 was wash-coated onto the precursor A such that the supported amount after calcining was 78.75 g per 1 liter of the cordierite carrier. Next, after this workpiece was dried for 20 minutes at 150° C., it was calcined for one hour at 500° C. in air to obtain a catalyst D having a lower catalyst layer and an upper catalyst layer formed on the cordierite carrier.

Table 1 below shows the composition of each catalyst. In Table 1 below, "pore connecting agent during layer formation" in the lower catalyst layer and upper catalyst layer indicates whether or not a pore connecting agent (polymethylmethacrylate) was used in forming the lower catalyst layer and upper catalyst layer on the cordierite support.

The average thickness of the lower catalyst layer and upper catalyst layer of each catalyst was measured using a microscope. Each catalyst was cut in a cross section perpendicular to the exhaust gas flow direction 1 cm from the exhaust gas inflow side end surface, and the average thickness of the lower catalyst layer and upper catalyst layer of five cells near the center of the cut surface was measured. The boundary portion was determined from the color changes of the lower catalyst layer and upper catalyst layer. Of the five cells, the thicknesses at the four corners were measured, and the average thickness of a total of 20 locations was obtained. The results are shown in Table 1.

and HC oxidation rate than comparative catalysts B to D of comparative examples 1 to 3.

Exhaust Gas Oxidation Performance Evaluation Test 2

The NO oxidation performance ($NO_2$ generation rate) of catalyst A of example 1 and comparative catalysts B to D of comparative examples 1 to 3 was evaluated based on the following. Specifically, each catalyst (1.3 L) was subjected to thermal aging treatment (durability treatment) using an electric furnace for 16 hours at 800° C. in an air atmosphere. After thermal aging, each catalyst was cooled to room temperature (25° C.) and then placed 100 cm behind the exhaust outlet of a 3.0 L turbocharged diesel engine, where the catalyst inlet temperature was raised from 110° C. to 400° C. at a rate of 25° C. per minute, and the $NO_2$ production rate (%) of each catalyst at 300° C. was measured.

Figure 4:
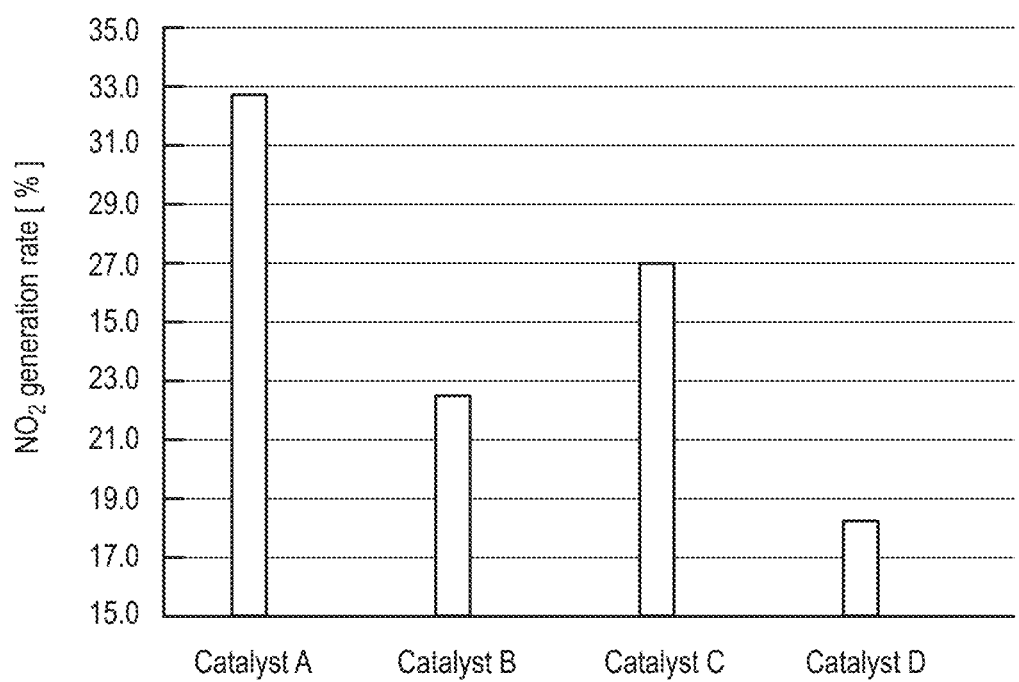
FIG. 4 is a graph that illustrates the NO oxidation performance ($NO_2$ oxidation rate) of the catalysts in the examples and comparative examples.

The results ($NO_2$ production rate for each catalyst) are shown in Table 2 and FIG. 4 below. From Table 2 and FIG. 4 below, catalyst A of example 1 can be seen to exhibit significantly higher NO generation rate than comparative catalysts B to D of comparative examples 1 to 3.

TABLE 1

| | Lower catalyst layer | | | | | | Upper catalyst layer | | | | | |
| --- | --- | --- | --- | --- | --- | --- | --- | --- | --- | --- | --- | --- |
| Catalyst | Pore connecting agent during layer formation | Thickness (μm) | Pt (g/L) | Pd (g/L) | Alumina (g/L) | Beta-zeolite (g/L) | $La_2O_3$ (g/L) | Pore connecting agent during layer formation | Thickness (μm) | Pt (g/L) | Pd (g/L) | Alumina (g/L) | $La_2O_3$ (g/L) |
| A | None | 136.98 | 0.83 | 0.42 | 50 | 27 | 2 | Present | 64.44 | 1.5 | 0.25 | 65 | 2 |
| B | Present | 162.36 | 0.83 | 0.42 | 50 | 27 | 2 | None | 52.74 | 1.5 | 0.25 | 65 | 2 |
| C | None | 140.13 | 0.83 | 0.42 | 50 | 27 | 2 | None | 54.72 | 1.5 | 0.25 | 65 | 2 |
| D | None | 140.44 | 0.83 | 0.42 | 50 | 27 | 2 | None | 73.89 | 1.5 | 0.25 | 75 | 2 |

Pore Size Distribution Measurement

Figure 2:
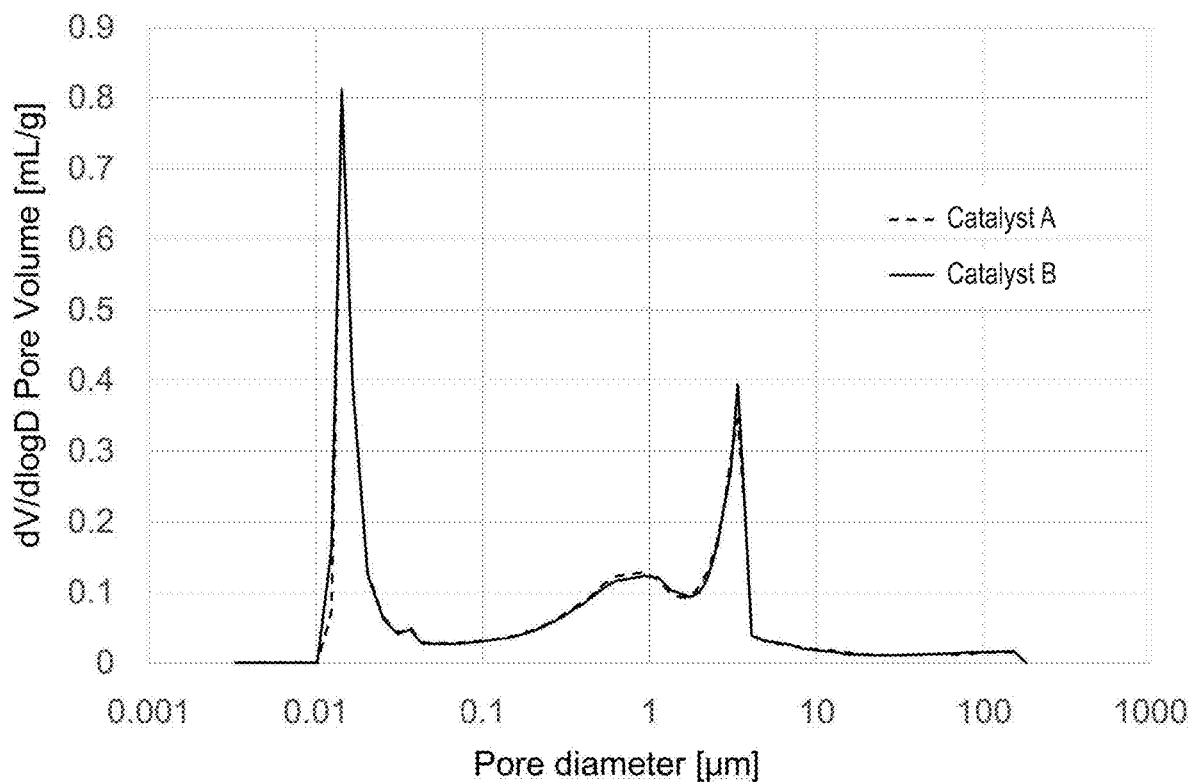
FIG. 2 is a graph that illustrates the pore size distribution of catalyst A of example 1 and catalyst B of comparative example 1.

The pore size distribution of catalysts A and B was measured using the mercury intrusion method. Specifically, a 600 mg sample was measured using a porosimeter (manufactured by the Shimadzu Corporation, trade name: Autopore III 9420). The results are illustrated in FIG. 2. From FIG. 2, it was observed that catalyst A and catalyst B prepared with the pore connecting agent had connected pores 1, 2, and 3 with three different pore peak sizes. Since catalysts A and B show almost similar pore size distributions, the pores in the upper catalyst layer are not considered to be distinguishable from those in the lower catalyst layer.

Exhaust Gas Oxidation Performance Evaluation Test 1

The exhaust gas oxidation performance (CO oxidation rate, HC oxidation rate and $NO_2$ generation rate) of catalyst A of example 1 and comparative catalysts B to D of comparative examples 1 to 3 were evaluated based on the following. Specifically, each catalyst (1.3 L) was subjected to thermal aging treatment (durability treatment) using an electric furnace for 16 hours at 800° C. in an air atmosphere. After thermal aging, each catalyst was cooled to room temperature (25° C.) and then placed at a position 100 cm behind the exhaust port of a 3.0 L turbo diesel engine. An NEDC mode evaluation was performed, and the CO oxidation rate (%) and HC oxidation rate (%) of each catalyst was measured. In addition, the exhaust gas temperature of the catalyst was within the range of 25 to 380° C.

Figure 3:
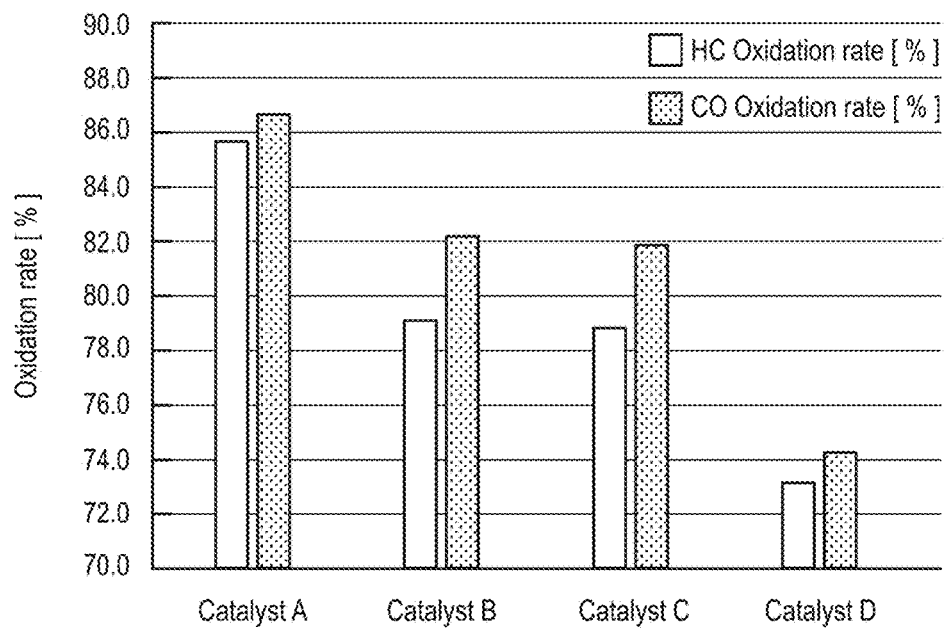
FIG. 3 is a graph that illustrates the CO and HC oxidation performance (CO oxidation rate and HC oxidation rate) of the catalysts in the examples and comparative examples.

The results (CO oxidation rate and HC oxidation rate of each catalyst) are shown in Table 2 and FIG. 3 below. From Table 2 and FIG. 3 below, it can be seen that catalyst A of example 1 exhibits significantly higher CO oxidation rate

TABLE 2

| | Exhaust Gas Oxidation Performance Evaluation Test 1 | | Exhaust Gas Oxidation Performance Evaluation Test 2 |
| --- | --- | --- | --- |
| Catalyst | CO oxidation rate (%) | HC oxidation rate (%) | $NO_2$ generation rate (%) |
| A | 85.6 | 86.6 | 32.7 |
| B | 79.1 | 82.2 | 22.5 |
| C | 78.8 | 81.8 | 27.0 |
| D | 73.2 | 74.3 | 18.3 |

Reference Example 1: Confirmation of Pores Derived from Pore Connecting Agents

Elemental analysis was performed on the catalyst A produced in Example 1 and the catalyst D produced in Comparative Example 3, and the amounts of carbon in the catalysts were measured. Catalysts A and D were cut and samples collected near the center of the catalyst, 50-70 mm from the catalyst end surface. Samples A' (upper layer) and D' (upper layer) were prepared respectively by peeling off only the upper catalyst layer from the collected samples while using a microscope. After peeling off the upper catalyst layer, samples A' (lower layer) and D' (lower layer) were respectively prepared by peeling off only the lower catalyst layer while using a microscope. Elemental analysis was performed on these samples. Elemental analysis was performed using a fully automatic elemental analyzer Vario EL Cube (manufactured by Elementar) in accordance with the manufacturer's instructions.

The results are shown in the following Table 3.

TABLE 3

|  | Carbon content [mass %] |
|---|---|
| Sample A' (upper layer) | 0.04 |
| Sample A' (lower layer) | Not detected |
| Sample D' (upper layer) | Not detected |
| Sample D' (lower layer) | Not detected |

From the results in Table 3, it was confirmed that the amount of carbon in catalyst A prepared using a pore connecting agent was higher than that in catalyst D prepared without a pore connecting agent. Since the same operation is performed except for the use of a pore connecting agent only in the formation of the upper catalyst layer of catalyst A, the increase in the amount of carbon in the above sample A' (upper layer) can be considered to be due to the pore connecting agent. Therefore, it is considered that whether or not the catalyst layer has pores derived from the pore connecting agent can be detected by measuring the amount of carbon (or increase thereof).

The present application is based on Japanese Patent Application No. 2018-247139 filed on Dec. 28, 2018, the disclosed content of which is incorporated by reference in its entirety.

DESCRIPTION OF REFERENCE NUMERALS

10, 10', 10": Catalyst
12: Exhaust gas
13: Pores with a large pore size
13': Pores with a small pore size
1: Pores with a small pore size
2: Pores with an intermediate pore sizes
3: Pores with a large pore size
14, 14', 14": Upper catalyst layer
15, 15' 15": Lower catalyst layer
16, 16', 16": Pores in the lower catalyst layer
17, 17', 17": Three-Dimensional Structure

What is claimed is:

1. An exhaust gas oxidation catalyst comprising:
   at least two layers, a lower catalyst layer and an upper catalyst layer, laminated on a three-dimensional structure, wherein
   said lower catalyst layer contains precious metals and alumina and/or zeolite, said precious metals being platinum and palladium,
   said upper catalyst layer contains precious metal and alumina and/or zeolite, and
   at least a part of said upper catalyst layer contains pores derived from a pore connecting agent with a combustion decomposition temperature of 300° C. or more to less than 450° C.

2. The catalyst according to claim 1, wherein the catalyst is used to oxidize an exhaust gas emitted from a diesel engine.

3. The catalyst according to claim 1, wherein the precious metals contained in the upper catalyst layer are platinum and palladium.

4. A method of preparing the exhaust gas oxidation catalyst according to claim 1, comprising:
   preparing a slurry for forming a lower catalyst layer by mixing precious metal precursors and alumina and/or zeolite, said precious metal precursors being a platinum precursor and palladium precursor,
   applying the slurry for forming a lower catalyst layer onto a three-dimensional structure, forming the lower catalyst layer containing platinum, palladium and alumina and/or zeolite onto the three-dimensional structure,
   preparing a slurry for forming an upper catalyst layer by mixing a pore connecting agent with, at a combustion decomposition temperature of 300° C. or more to less than 450° C., a precious metal precursor, and alumina and/or zeolite,
   applying the slurry for forming an upper catalyst layer onto the lower catalyst layer, then holding the workpiece in an oxygen containing gas at a temperature of higher than −170° C. to −20° C. or less relative to the combustion decomposition temperature, forming the upper catalyst layer containing precious metal and alumina and/or zeolite on the lower catalyst layer.

5. The method according to claim 4, wherein the average particle size of the pore connecting agent is greater than 0.4 μm and less than 15 μm.

6. The method according to claim 4, wherein the pore connecting agent is mixed at a ratio of 1 mass % or more to 15 mass % or less of the total solid content in the upper catalyst layer.

7. The method according to claim 4, wherein the catalyst is a catalyst for oxidizing an exhaust gas emitted from a diesel engine.

8. A method of oxidizing an exhaust gas, comprising treating exhaust gas with the catalyst according to claim 1.

9. A method of oxidizing an exhaust gas, comprising treating exhaust gas with the catalyst prepared by the method according to claim 4.

* * * * *